United States Patent
Fu et al.

(10) Patent No.: US 6,801,318 B2
(45) Date of Patent: Oct. 5, 2004

(54) APPARATUS AND METHOD FOR MEASURING INTENSITY AND PHASE OF A LIGHT PULSE WITH AN INTERFEROMETRIC ASYMMETRIC SINGLE-SHOT AUTOCORRELATOR

(75) Inventors: Qiang Fu, Forest Hills, NY (US); Sergei Petrovich Nikitin, East Setauket, NY (US); Anatoly Viktorovich Masalov, Troitzk (RU)

(73) Assignee: Excel/Quantronix, Inc., East Setauket, NY (US)

(*) Notice: Subject to any disclaimer, the term of this patent is extended or adjusted under 35 U.S.C. 154(b) by 88 days.

(21) Appl. No.: 10/136,655

(22) Filed: Apr. 30, 2002

(65) Prior Publication Data

US 2002/0180977 A1 Dec. 5, 2002

Related U.S. Application Data

(60) Provisional application No. 60/288,922, filed on May 4, 2001.

(51) Int. Cl.[7] ................................................ G01B 9/02
(52) U.S. Cl. ........................................ 356/450; 356/456
(58) Field of Search ......................... 356/305, 450, 356/451, 456, 521

(56) References Cited

U.S. PATENT DOCUMENTS

| | | | |
|---|---|---|---|
| 5,530,544 A | 6/1996 | Trebino et al. | 356/345 |
| 5,754,292 A | 5/1998 | Kane et al. | 356/345 |
| 6,008,899 A | 12/1999 | Trebino et al. | 356/345 |
| 6,628,383 B1 * | 9/2003 | Hilliard | 356/305 |

OTHER PUBLICATIONS

E.P. Ippen and C.V. Shank, Techniques for Measurement, pp. 84–122.

(List continued on next page.)

*Primary Examiner*—Samuel A. Turner
*Assistant Examiner*—Michael A. Lyons
(74) *Attorney, Agent, or Firm*—Darby & Darby

(57) ABSTRACT

An apparatus and method to measure optical intensity and phase of one or several light pulses is described. The apparatus combines a spectrally resolved interferometric asymmetric single-shot optical autocorrelator and imaging spectrograph. The asymmetric design of the optical autocorrelator based on second harmonic generation eliminates time-direction ambiguity, while a spectrally resolved interferometric pattern allows the performance of self-check and self-calibration of the apparatus and substantially improves convergence, robustness and reliability of the computational retrieval algorithm.

37 Claims, 23 Drawing Sheets

OTHER PUBLICATIONS

R.N. Gyuzalian, et al., "Background–Free Measurement for Time Behaviour of an Individual Picosecond Laser Pulse," *Optics Communications*, May 1979, vol. 29, No. 2, pp. 239–242.

Juan L. A. Chilla et al., "Direct determination of the amplitude and the phase of femtosecond light pulses,"*Optical Society of America*, Jan. 1, m1991, vol. 16, No. 1, pp. 39–41.

Daniel J. Kane et al., "Characterization of Arbitrary Femtosecond Pulses Using Frequency–resolved Optical Gating," *Journal of Quantum Electronics*, Feb. 1993, vol. 29, No. 2, pp. 571–579.

C. Iaconis et al., "Spectral phase interferometry for direct electric–filed reconstruction of ultrashort optical pulses," *Optical Society of America*, May 15, 1998, vol. 23, Nol. 10, pp. 792–794.

M. Beck et al., "Chronocyclic tomography for measuring the amplitude and phase structure of optical pulses," *Optical Society of America*, Dec. 1, 1993, vol. 18, No. 23, pp. 2041–2043.

Y. T. Mazurenko et al., Ultrafast time–to–space Conversion of phase by the method of spectral nonlinear optics, *Optical Society of America*, Nov. 1, 1996, vol. 21, No. 21, pp. 1753–1755.

V. Kabelka et al., Time–frequency imaging of a single ultrashort light pulse from anularly revolved autocorrelation, *Optical Society*, Jun. 1, 1995, vol. 20, No. 11, pp. 1301–1303.

Daniel J. Kane et al., "Single–short measurement of the intensity and phase of an arbitrary ultrashort pulse by using frequency–resolved optical gating," *Optical Society of America*, May 15, 1993, vol. 18, No. 10, pp. 823–825.

Kenneth W. DeLong et al., "Pulse retrieval in frequency–resolved optical gating based on the method of generalized projections," *Optical Society of America*, Dec. 15, 1994, vol. 19, No. 24, pp. 2152–2154.

Daniel J. Kane, "Simultaneous measurement of two ultrashort laser pulses from a single spectrogram in a single shot," *Optical Society of America*, Apr. 1997, vol. 14, No. 4, pp. 935–943.

Greg Taft et al., "Measurement of 10–fs Laser Pulses," *IEEE Journal of Selected Topics in Quantum Electronics*, Sep. 1996, vol. 2, No. 3, pp. 575–585.

L. Gallmann et al., "Characterization of sub–6–fs optical pulses with spectral hase interferometry for direct electric–filed reconstruction," Sep. 15, 1999, vol. 24, No. 18, pp. 1314–1316.

Donna Strickland et al., "Compression of Amplified Chirped Optical Pulses," *Optics Communication*, Dec. 1, 1985, vol. 56, No. 3, pp. 219–221.

Jerome Paye et al., "Measurement of the amplitude and phase of ultrashort light pulses from spectrally resolved autocorrelation," *Optical Society of America*, Nov. 15, 1993, vol. 18, No. 22, pp. 1946–1948.

Kenneth W. DeLong et al., "Improved ultrashort pulse–retrieval algrothm for frequency–resolved optical gating," *Optical Society of America*, Sep. 1994, vol. 11, No. 9, pp. 2429–2337.

Technical Digest, Summaries of papers presented at the Conference on Lasers and Electro–Optics, *IEEE/Lasers and Electro–Optics Society OSA–Optical Society of America*, 2001, p. 274.

A.P. Kovács et al., "Group–delay measurement on laser mirrors by spectrally resolved white–light interferometry," *Optical Society of America*, Apr. 1, 1995, vol. 20, No. 7, pp. 788–790; and.

William H. Press, et al., "Numerical Recipes in C, The Art of Scientific Computing," pp. 59–71.

* cited by examiner

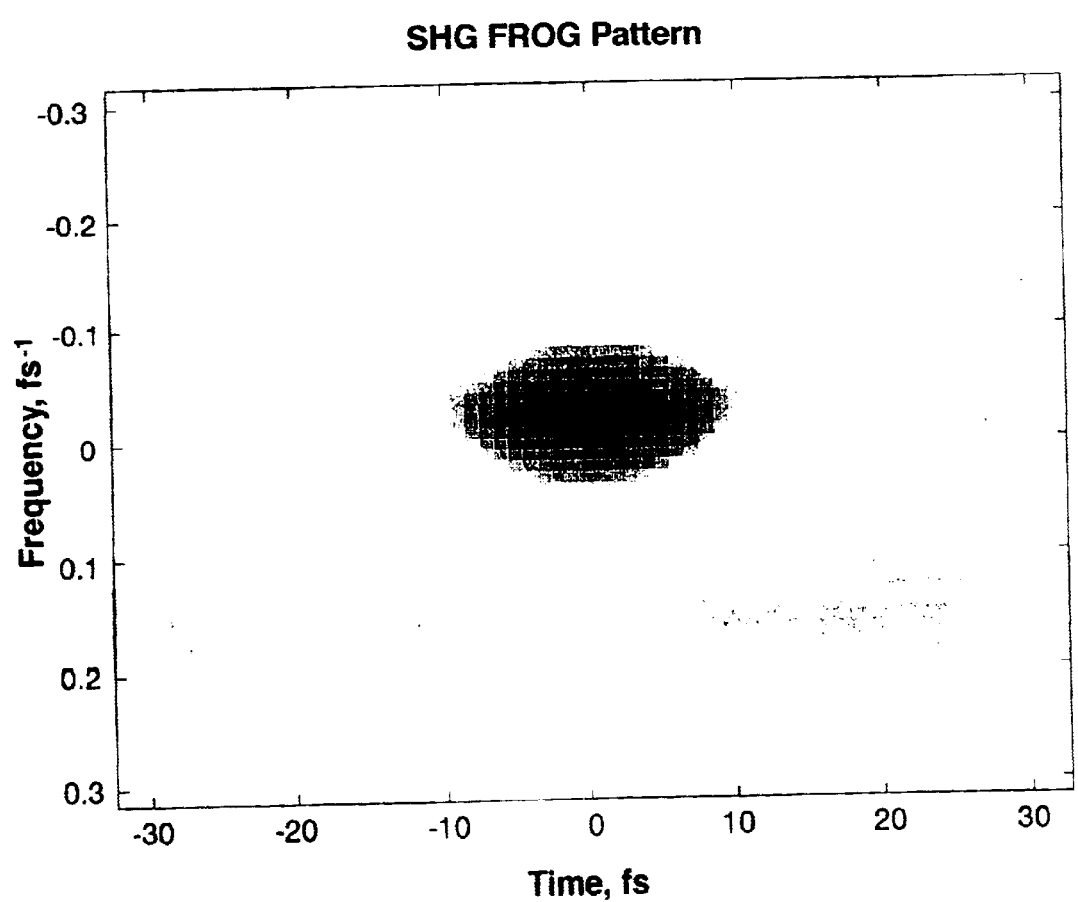

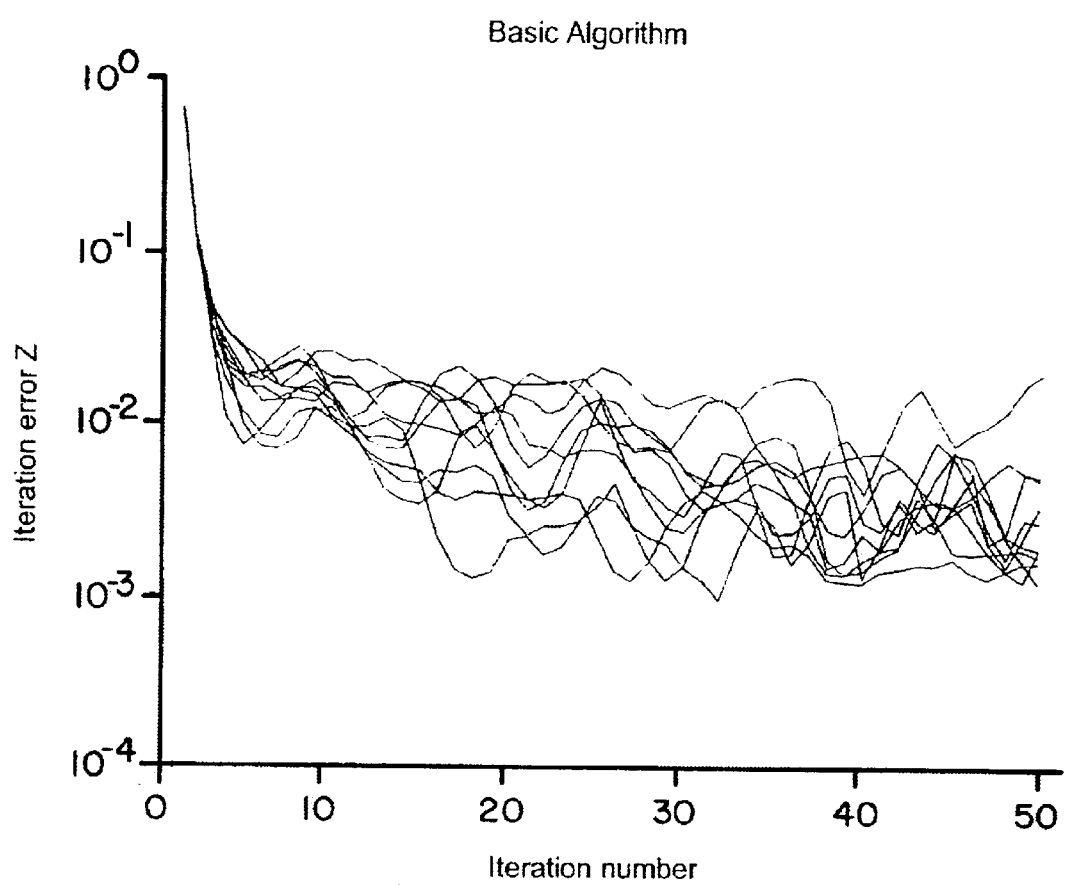

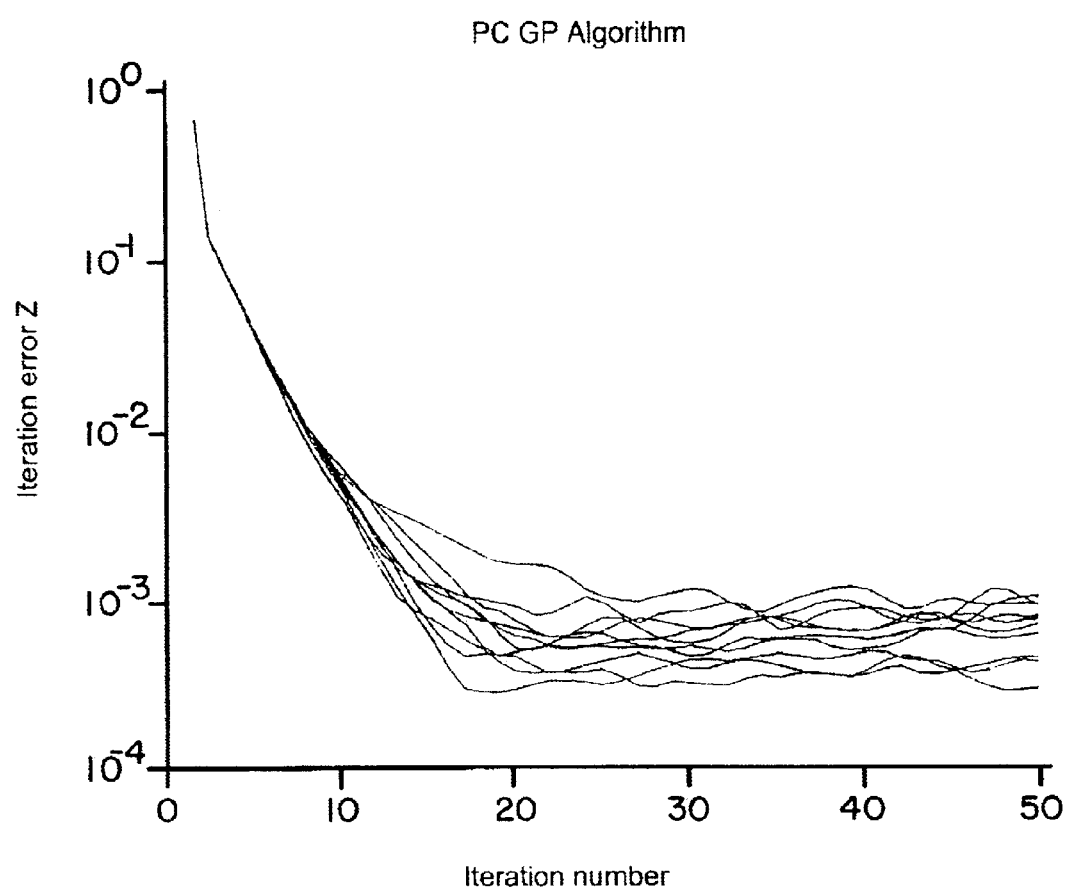

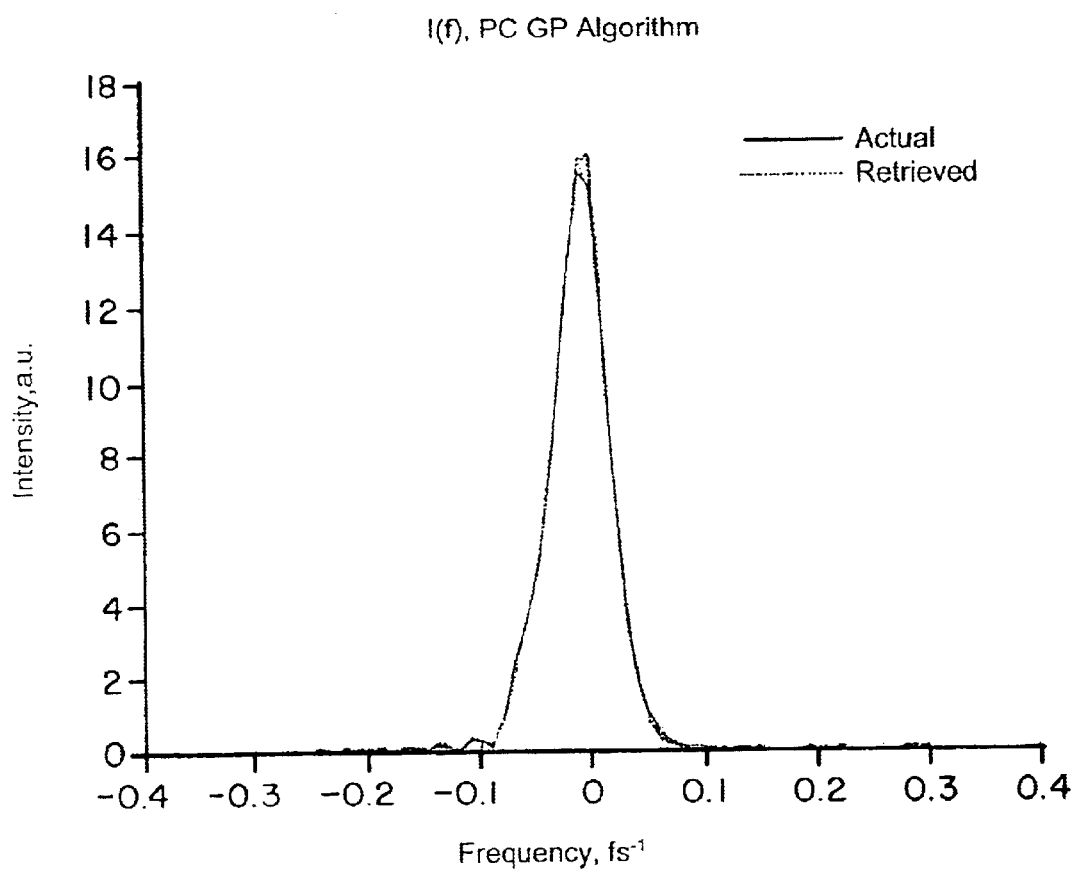

APPARATUS AND METHOD FOR MEASURING INTENSITY AND PHASE OF A LIGHT PULSE WITH AN INTERFEROMETRIC ASYMMETRIC SINGLE-SHOT AUTOCORRELATOR

CROSS REFERENCE TO RELATED APPLICATIONS

This application claims the benefit of priority of provisional U.S. patent application Ser. No. 60/288,922 entitled "Apparatus and Method for Measuring Intensity and Phase of a Light Pulse with an Interferometric Asymmetric Single-Shot Autocorrelator," filed May 4, 2001, the disclosure of which is incorporated herein by reference in its entirety.

FIELD OF THE INVENTION

The present invention relates generally to an optical correlator, and in particular to an asymmetric single shot autocorrelator.

BACKGROUND OF THE INVENTION

Historically, early optical correlators measured the intensity correlation function of two light pulses by combining them together in a nonlinear optical media to generate a sum frequency signal as described in E. P. Ippen and C.V. Shank, "Techniques for measurement" in Ultrashort Light Pulses-Picosecond Techniques and Applications, S. L. Shapiro, ed., 83 (Springer-Verlag, Berlin, 1977), herein incorporated by reference in its entirety. The intensity of the sum frequency signal was then measured as a function of relative pulse delay. In the case where the pulse is combined with its own replica, the result of such a measurement is an autocorrelation function of the pulse. Since the optical frequency of the nonlinear output in this case equals the frequency of the second harmonic of the pulse, nonlinear mechanisms employed in these autocorrelators are referred to as second harmonic generation ("SHG"). Adjustable time delay between the two pulses can be introduced either by using a regular scanning optical delay line or by overlapping wide and spatially uniform pulsed beams intersecting at an angle. In the latter case, the measurement of the correlation function can be performed with only one light pulse as discussed in R. N Gyuzalian., S. B. Sogomonian and Z. G. Horvath, "Background-free measurement of time behavior of an individual picosecond laser pulse", Opt. Commun. 29, 239-242 (1979), ("the Gyuzalian reference"), herein incorporated by reference in its entirety. This experimental arrangement is known as a 'single shot autocorrelation'.

Optical correlators, while simple, have an important drawback. Optical correlators can not derive an actual time dependent optical E-field of a pulse based on the measured correlation function. To overcome this disadvantage, several new techniques were developed as discussed in J. L. A. Chilla and O. E. Martinez, "Direct measurement of the amplitude and the phase of femtosecond light pulses", Opt. Lett. 16, p. 39-41 (1991), D. J. Kane and R. Trebino, Opt. Lett. 18, p. 825 (1993), IEEE Journal of Quantum Electron. 29, p. 571-579, (1993). ("the Kane reference"), C. Iaconis and I. A. Walmsley "Spectral phase interferometry for direct electric-field reconstruction of ultrashort optical pulses" Opt. Lett., 23, pp. 792 (1998) ("the Iaconis reference"), M. Beck, M. G. Raymer, I. A. Walmsley and V. Wong "Chronocyclic tomography for measuring the amplitude and phase structure of optical pulses", Opt. Lett. 18, pp. 2041 (1993), Y. T. Mazurenko, S. E. Putilin, A. G. Spiro, A. G. Beliaev, V. E. Yashin and S. A. Chizhov "Ultrafast time-to-space conversion of phase by the method of spectral nonlinear optics" Opt. Lett. 21, pp. 1753 (1996), V. Kabelka, A. V. Masalov "Time-frequency imaging of a single ultrashort light pulse from angularly resolved autocorrelation", Opt. Lett. 20, pp. 1301 (1995), and D. J. Kane and R. Trebino, Opt.Lett. 18, pp. 823 (1993) (the Trebino reference"), herein incorporated by reference in their entirety.

Presently, the most commonly used techniques for ultrashort light pulse characterization are FROG (Frequency Resolved Optical Gating) as in the Kane reference and SPIDER (Spectral Phase Interferometry for Direct Electric-field Reconstruction) as in the Iaconis reference. Both techniques are available commercially and were successfully used to measure properties of light pulses shorter than 10 femtoseconds as discussed in G. Taft, A. Randquist, M. Murnane, I. P. Christov, H. Kapteyn, K. DeLong, D. Fittinghoff, M. Krumbugel, J. Sweetser and R. Trebino "Measurement of 10-fs Laser pulses" IEEE J. Sel. Top. Quantum Electron. 2, pp. 575-585 (1996) and L. Gallmann, D. H. Sutter, N. Matushek, G. Steinmeyer, U. Keller, C. Iaconis and I. A. Walmsley "Characterization of sub-6-fs optical pulses with spectral phase Interferometry for direct electric-field reconstruction", Opt. Lett. 24, pp. 1314 (1999), herein incorporated by reference in their entirety.

SPIDER is an interferometric technique where the optical phase of the pulse is determined from a one-dimensional pattern, formed in frequency-domain as a result of interference between two time-separated replicas of the pulse whose spectra are frequency-shifted. The output of the SPIDER is the intensity of this interferometric pattern measured as a function of optical frequency. A very important advantage of SPIDER is that this method does not require an iterative algorithm to retrieve the pulse E-field. In addition, SPIDER allows the measurement not only of magnitude of pulse chirp, but its overall sign as well. However, SPIDER has a more complicated optical scheme: it requires three replicas of input pulse to form the interference pattern (instead of two replicas, as in case of SHG-FROG).

SHG-FROG is essentially a spectrally resolved optical correlator, where an optical spectrum of the nonlinear signal from the correlator is recorded as a function of optical delay. The result of an SHG-FROG measurement can be presented as a two-dimensional image, where intensity is a function of delay time and optical frequency. This image is also known as an SHG-FROG pattern. Data contained in such a pattern are sufficient to compute the E-field of the pulse resulting in the pattern.

Compared to SPIDER, SHG-FROG is easier to implement experimentally. It also appears to be less sensitive to experimental noise and calibration errors since the two-dimensional SHG-FROG pattern is actually mathematically redundant for pulse retrieval purposes. However, a range of possible applications for SHG-FROG is limited because SHG-FROG requires numerically intensive data processing procedures to retrieve the optical phase and intensity of a pulse from the measured SHG-FROG pattern as discussed in D. J. Kane and R. Trebino, Opt. Lett. 18, pp. 823 (1993) ("the Trebino reference") and K. W. DeLong, D. Fittinghoff, R. Trebino, B. Kohler and K. Wilson "Pulse retrieval in frequency-resolved optical gating based on the method of generalized projections", Opt. Lett. 19, pp. 2152-2154 (1994) ("the DeLong reference") and "Simultaneous measurement of two ultrashort laser pulses from a single spectrogram in a single shot," D. J. Kane, G. Rodriguez, A. J. Taylor, and T. S. Element, JOSA B 14, pp. 935-943 (1997), herein incorporated by reference in their entirety. Another disadvantage specific to both an SHG autocorrelator and an SHG-FROG is the inability of these diagnostics to establish the direction of time axis, so that the pulse and time-reversed replica are distinguishable. All these disadvantages limit the possibility to use SHG-FROG as a diagnostic tool for real time low-intensity applications.

It is thereby desirable to design an ultrashort light pulse characterization system that solves the aforementioned problems.

SUMMARY OF THE INVENTION

The present invention is directed to a method for characterization of a light pulse such that time ambiguity of the pulse is removed and the sign of the phase modulation of at least one input beam is determined. First, a first fundamental beam and a second fundamental beam are optically delayed in a nonlinear crystal. The optical delay of the first fundamental beam and the second fundamental beam is:

$$\tau = 2 \sin(\alpha/2) x/c;$$

wherein $\alpha$ represents the intersecting angle of the first fundamental beam and the second fundamental beam; x represents a vertical coordinate position at a surface of the crystal; c represents the speed of light in a vacuum. Then, nonlinearity is introduced to the first fundamental beam and the second fundamental beam through a nonlinear mechanism. Nonlinear mechanisms can include, but are not limited to sum frequency generation, polarization gating, and self-diffraction. Finally, asymmetry is imputed to at least one of the nonlinear beams by using a blocking mask. In particular, the following asymmetric (-auto) correlation function can be obtained:

$$I_{AAC}(\tau) \propto \int |2E(t+\tau)E(t)+E^2(t)|^2 dt$$

wherein E(t) represents a time domain analytic signal of the light beam; and $\tau$ represents optical delay between the first fundamental beam and the second fundamental beam.

BRIEF DESCRIPTION OF THE ILLUSTRATIVE EMBODIMENTS

FIG. 5 depicts a graph of a numerically simulated SHG-FROG pattern;

FIG. 6(a) depicts a graph of the pulse retrieval of the pattern shown in FIG. 5 using the prior art SHG-FROG algorithm;

FIG. 8(a) depicts a graph of the pulse retrieval of the pattern shown in FIG. 5 using the prior art PC GP algorithm;

FIG. 8(b) depicts a graph of the pulse spectra of the pattern shown in FIG. 5 using the prior art PC GP algorithm;

DETAILED DESCRIPTION OF ILLUSTRATIVE EMBODIMENTS

Figure 1:
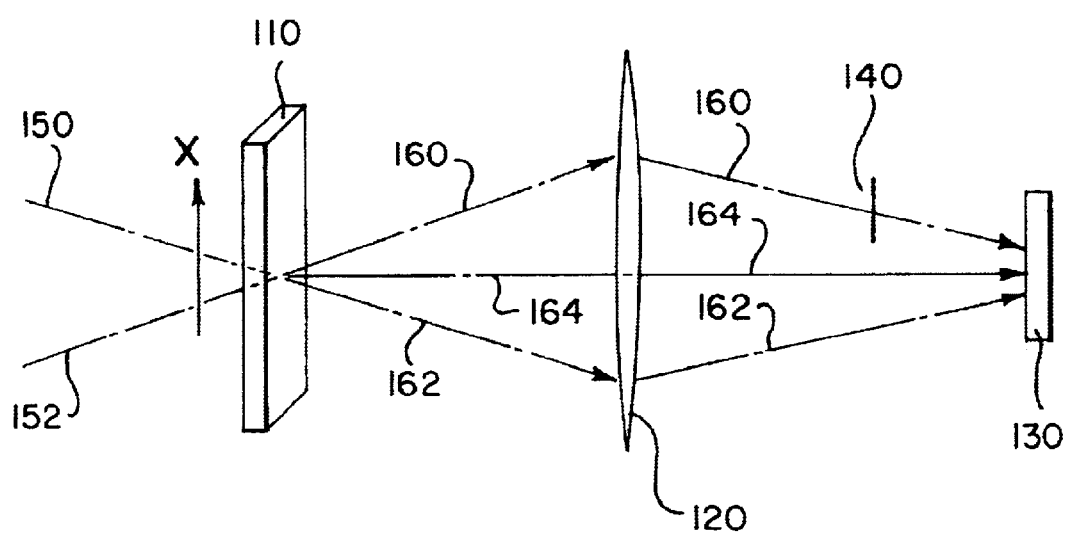
FIG. 1 depicts an asymmetric single shot autocorrelator in accordance with a first embodiment of the present invention.

By way of overview and introduction, a single-shot autocorrelator for a laser pulse diagnostic is herein described. Autocorrelation characterizes ultrashort pulses, when time resolution through other methods (direct photodiode measurement, streak cameras etc.) is inadequate. The present invention is directed to completely and unambiguously characterized arbitrarily shaped ultrashort light pulses and/or optical dispersion by detecting an interferometric pattern produced by several beams generated in a nonlinear optical medium in combination with interferometric patterns produced by the beams at fundamental frequency and computing optical amplitude and phase of the ultrashort pulse from these interferometric patterns using proper mathematical algorithms. One advantage of the autocorrelator of the present invention is that the present invention obtains fringe-resolved patterns in a single shot regime. Another advantage of the autocorrelator of the present invention is that the present invention eliminates 'time-direction ambiguity.' 'Time-direction ambiguity,' as discussed above, is specific to second harmonic generation based autocorrelation methods. The present invention accomplishes these advantages, in part, by allowing multiple beam generation and, in part, by placing a blocking mask behind a nonlinear crystal.

A second embodiment of the present invention uses am imaging spectrograph having collimating spherical mirror, diffraction grating, and two image detectors. The two image detectors allow one to simultaneously acquire spectrally resolved interference patterns formed by both fundamental and harmonic beams in the method of autocorrelation in a nonlinear crystal. Pulse characterization implies that both time dependent intensity of the pulse and its phase modulation (also known in the field as 'chirp') is measured.

The description presented herein relates to the autocorrelators employing sum-frequency and second harmonic generation, since this nonlinear mechanism is very efficient and allows one to characterize relatively weak light pulses. For example, these methods are suitable to measure properties of unamplified pulses directly from femtosecond laser oscillators. It should be noted, however, that the approach to the problem of pulse characterization described here could be easily generalized to include other nonlinear mechanisms, such as polarization gating or self-diffraction. Additionally, the apparatus described here as an autocorrelator, can be modified for linear interferometry at fundamental frequency. In this case, it can also be used to directly measure the amount of optical dispersion in an optical system as was demonstrated in S. Nikitin, Aiguo Cui and Qiang Fu "Real-time dispersion measurement of a femtosecond laser amplifier with spectrally resolved interferometer", presented at CLEO-2001 (Baltimore Md., May 2001), herein incorporated by reference in its entirety.

An apparatus described here in accordance with the present invention employs highly efficient SHG nonlinear mechanisms suitable for characterization of weak optical pulses and allows elimination of time-direction ambiguity of the retrieved pulse shape. Additionally, the apparatus described herein improves the reliability of the retrieved data. In particular, single-shot autocorrelation techniques provide accurate measurement of the optical autocorrelation function only if the input beams have uniform spatial profiles, flat wave fronts and spatially uniform spectral content. In practice, some, if not all, of these assumptions may be wrong. For example, improper alignment of a femtosecond laser system based on the method of chirped pulse amplification may result in a spatially dependent spectrum also known as 'color separation' at the output of the system. For an example of such prior art problems as discussed in D. Strickland and G. Mourou, Opt. Commun. 56, pp. 219-221 (1985), herein incorporated by reference in its entirety. Other alignment problems, such as diffraction at optical apertures or improper beam collimation may also cause errors in pulse characterization. The apparatus according to the present invention is able to diagnose many of these alignment problems at an early stage prior to numerically intensive pulse characterization.

Finally, to take advantage of the described apparatus new data retrieval algorithms are proposed. These algorithms include an independently measured optical spectrum as an additional constraint and compared to previously published algorithms demonstrates substantially improved convergence and reduced sensitivity of the retrieved pulse to the experimental noise.

One purpose of this invention is to characterize an optical pulse. An arbitrary optical pulse is completely described by its complex analytic signal E(t). Once the analytic signal E(t) is known, the real-valued electric field $\epsilon(t)$ of the pulse is calculated as $\epsilon(t)=E(t)+E(t)^*$. The analytic signal is obtained from $\epsilon(t)$ as follows:

1. Calculate Fourier image of $\epsilon(t)$ as:

$$\varepsilon(f) = \int_{-\infty}^{+\infty} \varepsilon(t)\exp(2\pi i f t)dt \quad \text{(Eq. 1)}$$

where f is an optical frequency. Note, that $\epsilon(t)$ is real, so that $\epsilon(-f)=(f)^*$.

2. In the frequency domain, the analytic signal is defined as $$E(f) = \begin{cases} \varepsilon(f) & f > 0 \\ 0 & f \leq 0 \end{cases} \quad \text{(Eq. 2)}$$

3. In the time domain, the analytic signal can be calculated using inverse Fourier transform, as follows:

$$E(t) = \int_{-\infty}^{\infty} E(f)\exp(-2\pi i f t)df \quad \text{(Eq. 3)}$$

As seen from the definition above, the experimentally measured optical spectrum $|\epsilon(f>0)|^2$ equals to $|E(f)|^2$.

The analytic signal is often presented as a product of a slowly varying complex amplitude A (t) and a term, oscillating at a fixed optical carrier frequency $v_0$, that is $E(t)=A(t)\exp(-2\pi i v_0 t)$. The task of pulse characterization is therefore completed if either E(t) or its Fourier image has been measured.

FIG. 1 depicts the first embodiment of the present invention which is an autocorrelator modified in accordance with the present invention. A single shot autocorrelator is described in the Gyuzalian reference discussed above. As shown in FIG. 1, two wide, spatially uniform and collimated fundamental beams of optical carrier frequency $v_0$ 150, 152 overlap at a small angle in a volume of a thin nonlinear crystal 110. In the case of autocorrelation mode, these beams can be produced using a beam splitter, not shown in the figure. Intersection of two fundamental beams 150,152 at a small angle $\alpha$, results in variation of optical delay between the pulses in different locations in the volume of the crystal. The relative time delay $\tau$ is related to the vertical coordinate position at the surface of the crystal x as:

$$\tau = 2\sin(\alpha/2)x/c \quad \text{(Eq. 4)}$$

If the optical delay between the two beams 150, 152 is adjusted properly, the pulses overlapping in the nonlinear crystal 110 generate three different nonlinear beams 160, 162, 164 at a doubled optical frequency $2v_0$. The top and bottom beams 160, 162 include the fundamental frequency of the input beams 150,152 and the second harmonic. The third beam 164 is the sum frequency signal and includes only the beam at a doubled optical frequency. It is essential that the nonlinear crystal 110 is thin enough to satisfy the phase matching conditions for all three non-linear second harmonic beams 160, 162. In a prior art single-shot autocorrelator as described in the Gyuzalian reference only the sum-frequency second harmonic signal 164 is detected. In the apparatus according to the present invention, all three nonlinear second harmonic beams 160, 162, 164 generated inside the nonlinear crystal are refracted by the lens 120 which images the crystal volume onto the image detector 130. Beams 160, 162 and 164 produce an interference pattern at the plane of registration. The detector 130 registers the time-integrated intensity of the nonlinear optical signal generated in the crystal at different positions of x. Because of the correspondence between the position in the volume of the crystal x and the relative time delay $\tau$ given by (Eq. 4), the interference pattern registered by the detector actually represents an optical correlation function. One important difference between prior art single shot autocorrelators and the arrangement described herein is the generation of multiple nonlinear beams and the presence of a mask 140, which can selectively block beams generated in the crystal 110.

In particular, when all three second harmonic beams 160, 162, 164 reach the surface of the image detector 130, the image detector 130 registers a fringe-resolved symmetric autocorrelation function:

$$I_{INT}(\tau) \propto \int |E^2(t+\tau)+2E(t+\tau)E(t)+E^2(t)|^2 dt \qquad (Eq. 5)$$

If the two second harmonic beams 160,162 are blocked, only the sum-frequency signal 164 reaches the image detector 130. The image detector 130 then registers a standard single-shot autocorrelation function as seem in the prior art FROG correlators:

$$I(\tau) \propto \int |2E(t+\tau)E(t)|^2 dt \qquad (Eq. 6)$$

Both these functions are symmetric and do not allow one to distinguish a pulse described by the analytic signal E(t) from its time reversed replica E*(−t).

Now consider a case when a mask 140 is placed into one of the harmonic beams 160,162 as shown in FIG. 1. In this case, the image detector 130 registers an interferometric pattern produced by only the two beams 162, 164 and corresponds to the asymmetric autocorrelation function:

$$I_{AAC}(\tau) \propto \int |2E(t+\tau)E(t)+E^2(t)|^2 dt$$

The autocorrelation function obtained in such an autocorrelator is no longer symmetric and allows one to determine the sign of the phase modulation of the pulse. The arrangement depicted in FIG. 1 will be referred to as an asymmetric single shot autocorrelator ("ASSA").

As in case of a prior art autocorrelator, it is possible to measure an optical spectrum of the nonlinear signal from ASSA, rather than simply its time-integrated intensity. This could be done if an ASSA output is optically relayed to the entrance slit of an imaging optical spectrograph. In this case the image detector of the spectrograph acquires a two-dimensional image corresponding to the spectrally resolved autocorrelation function.

The apparatus described herein is not subjected to time-direction ambiguity. This is an important advantage over other spectrally resolved autocorrelation methods, e.g., SHG-FROG. Additionally, prior art SHG-FROG diagnostics are based on the sum frequency signal only and therefore do not register interference fringes. In a spectrally resolved ASSA, the interference fringes are observed and this interference pattern provides important information about spectral phase and amplitude of a pulse. Accuracy and reliability of ASSA can be further improved if in addition a spectrally resolved interference pattern formed by fundamental input beams is acquired. Such extended ASSA apparatus is capable of operating as an optical spectrograph, prior art SHG-FROG correlator, and optical dispersion analyzer and could be described as SPectrally Resolved INTerferometric Asymmetric Single Shot Autocorrelator ("SPRINT ASSA").

Figure 2:
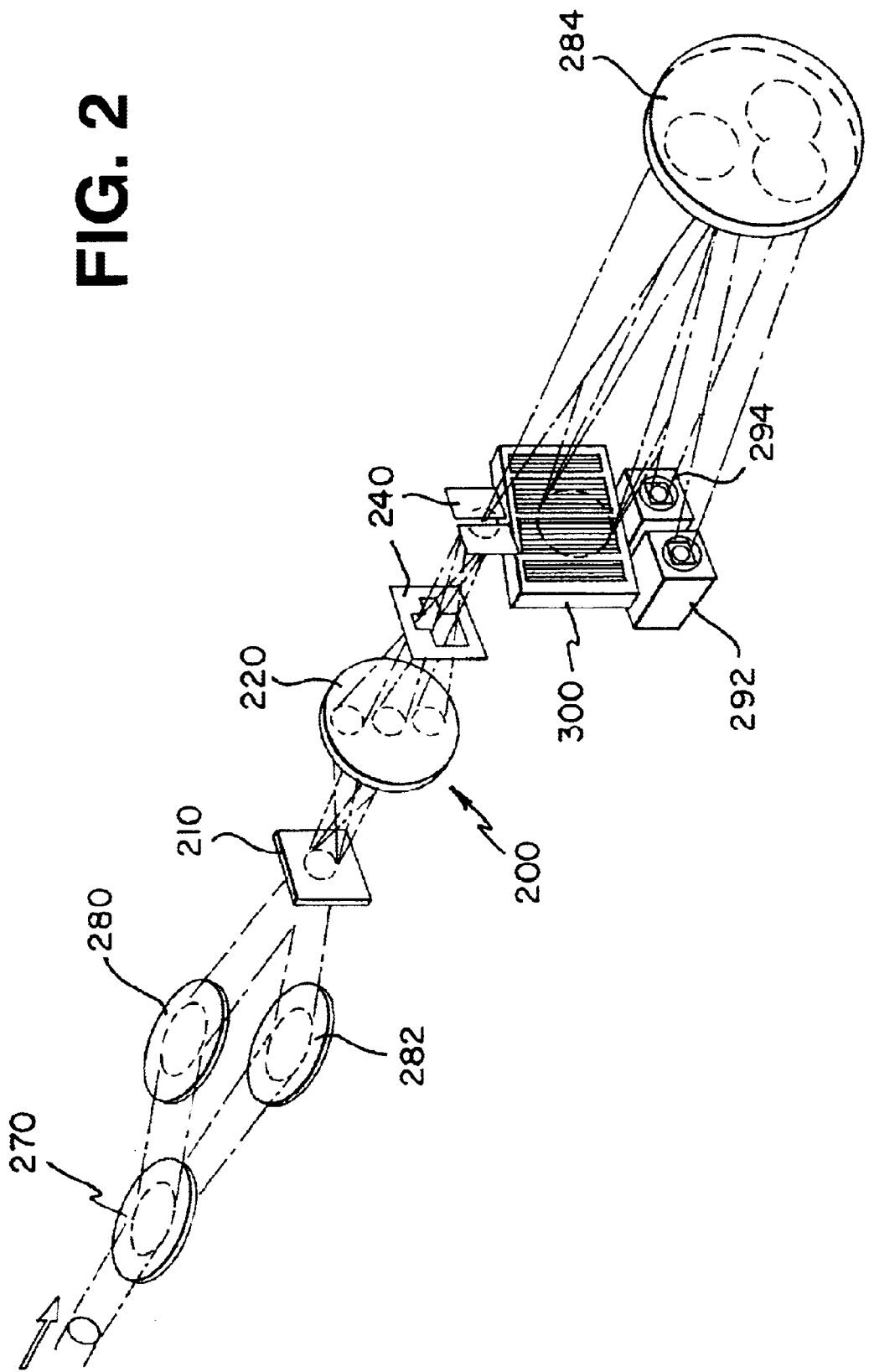
FIG. 2 depicts an asymmetric single shot autocorrelator in accordance with a second embodiment of the present invention.

FIG. 2 depicts an asymmetric single shot autocorrelator in accordance with a second embodiment of the present invention, a SPRINT ASSA apparatus 200. A beam splitter 270 divides an input laser beam of optical carrier frequency $v_0$. As described above, two beams formed by the splitter 270 are reflected by mirrors 280, 282 and converge in the vertical plane until they overlap in the volume of a thin nonlinear crystal 210. The optical delay between the beams in the center of the crystal can be adjusted by moving the beam splitter 270 and normally equals zero. The lens 220 refracts all three beams generated in the volume of the crystal and images the crystal onto the vertical slit 240 of an imaging spectrograph. A block-mask 290 is placed between the lens 220 and the slit 240. The block mask 290 could be set optionally in three different positions. In the first position, the block mask 290 blocks the two second harmonic beams, in the second position it only blocks one of the second harmonic beams and in the third position none of the second harmonic beams is blocked. Slit 240 is an entrance slit of an imaging spectrograph, formed by collimating spherical mirror 284, diffraction grating 300, and two image detectors 292, 294. The detectors 292, 294 register images of the entrance slit of the spectrograph, which is stretched into the spectrum in the direction perpendicular to the slit 240. Image detector 294 registers the resulting image around fundamental optical frequency $v_0$, while image detector 292 registers the pattern at the optically doubled frequency $2 v_0$.

Depending on the position of the mask 290, the autocorrelator of FIG. 2 achieves three modes of operation, namely SPRINT ASSA mode, Interferometric mode, and prior art SHG-FROG mode.

The autocorrelator of FIG. 2 achieves SPRINT ASSA mode, when the mask 290 blocks only one of the second harmonic beams 160,162. In this mode the image detector 292 registers a spectrally resolved SPRINT ASSA two-dimensional pattern:

$$S_{ASSA}^{(2v)}(f,x) \to S_{ASSA}^{(2v)}(f,\tau) \propto |\int\{2E(t+\tau)E(t)+E^2(t)\}\exp(2\pi i f t)dt|^2 \qquad (Eq. 8)$$

It is assumed in (Eqs. 8, 10-12) that the relation between $\tau$ and the position in the crystal volume x was established using (Eq. 4).

This image consists of three contributions. The first contribution is the prior art SHG-FROG pattern. The second contribution is the energy spectrum of the second harmonic, pattern independent of time delay $\tau$. The third contribution is an interferometric pattern that contains information about the field of the pulse. The analytic signal corresponding to this interferometric contribution is proportional to the product of the FROG signal and amplitude spectrum of second harmonic field. Registration of this interferometric contribution is one of the most important features of the SPRINT ASSA mode and eliminates time-direction ambiguity in the retrieval process.

If conversion efficiency in the crystal is small, which is justified by the short length of the crystal, the image detector 294 registers the optical spectrum of the not depleted fundamental signal, which is spatially resolved along the entrance slit of the spectrograph:

$$S_{ASSA}^{(v)}(f,x) \propto |\int E(t,x)\exp(2\pi i f t)dt|^2 \qquad (Eq. 9)$$

where x is a position in the crystal imaged on the entrance slit of the spectrograph. In the case of a spatially independent spectrum of the beam, the quantity acquired by the image detector 294 is a regular optical spectrum of the input beam.

The autocorrelator of FIG. 2 achieves interferometric mode, when the mask 290 is completely removed and none of the beams 160,162, 164 are blocked. In this mode the image detector 292 registers a nonlinear interferometric pattern at the second harmonic frequency:

$$S_{INT}^{(2v)}(f,x) \to S_{INT}^{(2v)}(f,\tau) \propto |\int\{E^2(t+\tau)+2E(t+\tau)E(t)+E^2(t)\}\exp(2\pi i f t)dt|^2 \qquad (Eq. 10)$$

while image detector 294 registers a linear interferometric pattern at the fundamental frequency:

$$S_{INT}^{(v)}(f,x) \to S_{INT}^{(v)}(f,\tau) \propto |\int \{E(t+\tau)+E(t)\}\exp(2\pi ift)dt|^2 \quad \text{(Eq. 11)}$$

These interferometric patterns can be used for beam diagnostic, delay calibration and dispersion analysis.

The autocorrelator achieves the prior art SHG-FROG mode when the second harmonic beams 160,162 are blocked, and the sum frequency signal 164 is not blocked by the mask 290, so that image detector 294 registers no signal at the fundamental frequency, while image detector 292 registers the standard SHG-FROG pattern:

$$S_{FROG}^{(2v)}(f,x) \to S_{FROG}^{(2v)}(f,\tau) \propto |\int \{2E(t+\tau)E(t)\}\exp(2\pi ift)dt|^2 \quad \text{(Eq. 12)}$$

Figure 3A:
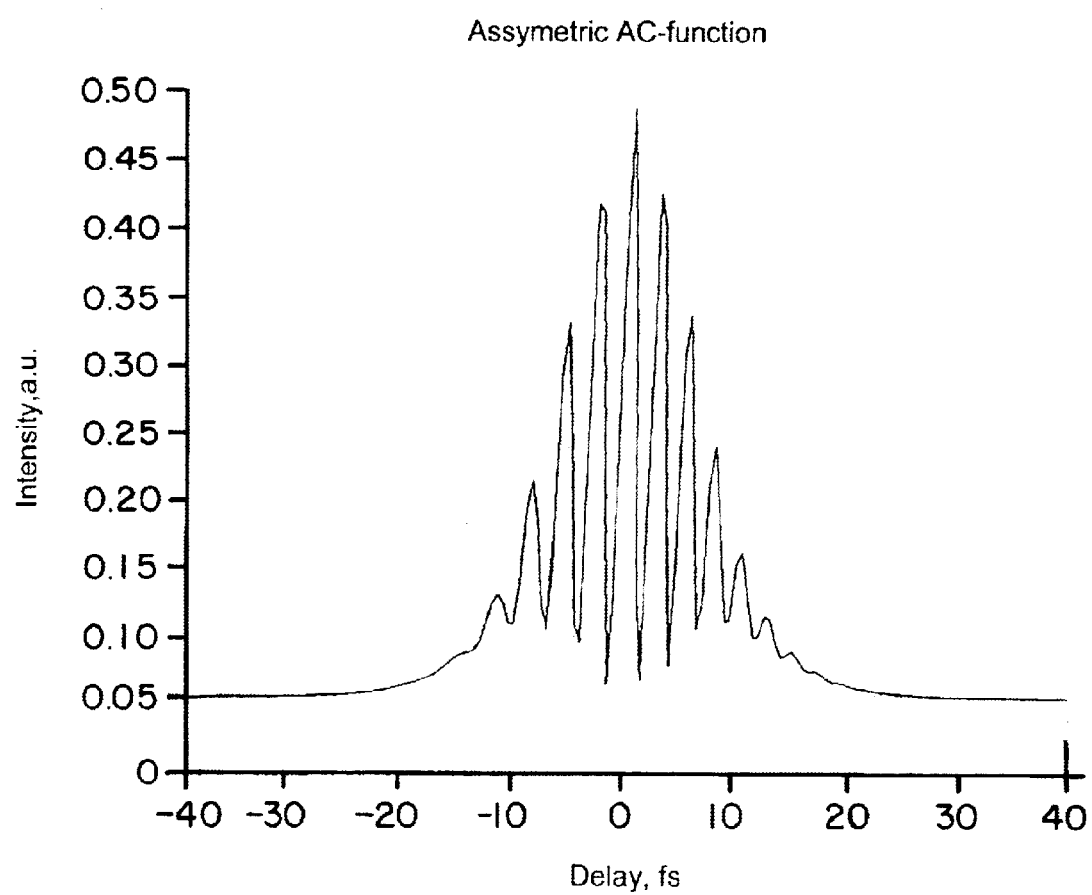
FIG. 3(a) depicts a graph of a numerically simulated asymmetric fringe resolved correlation function in accordance with the first embodiment.
Figure 3B:
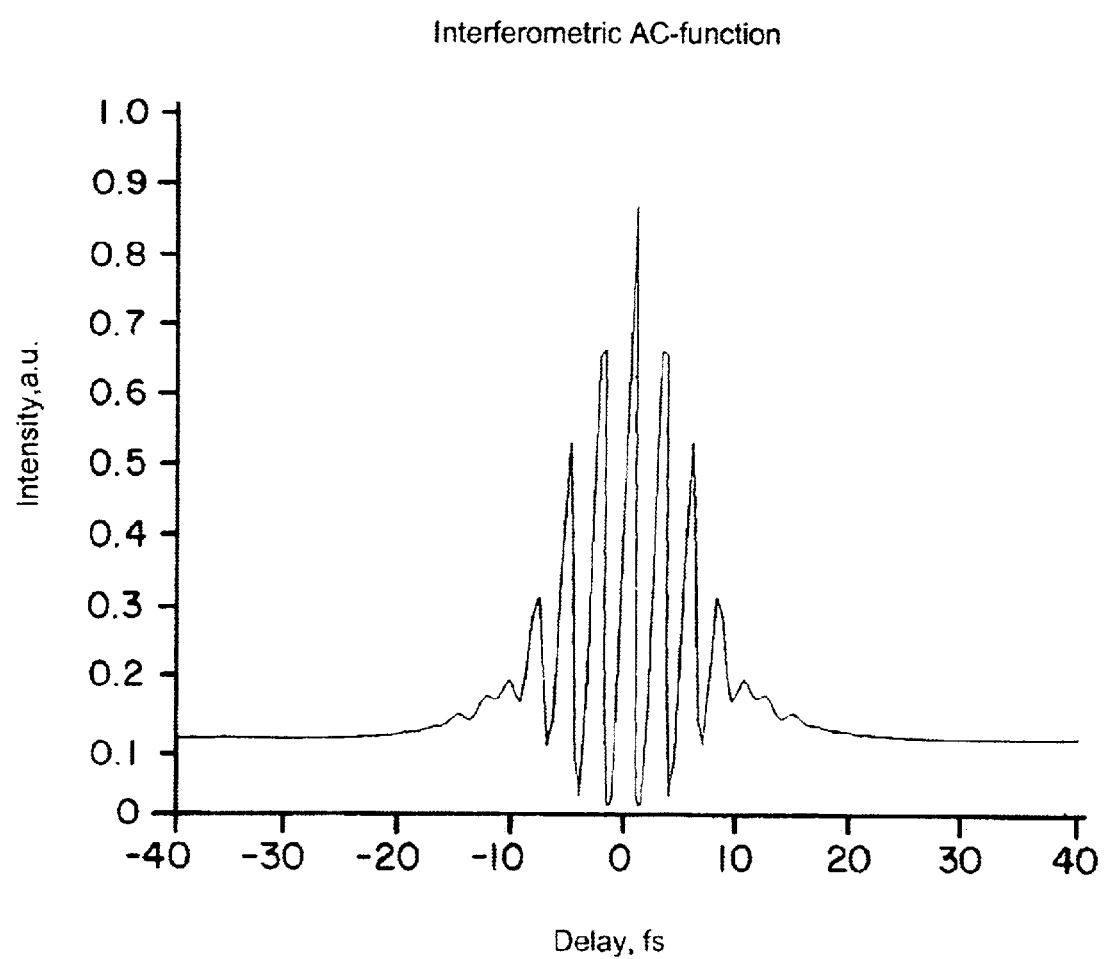
FIG. 3(b) depicts a graph of a numerically simulated symmetric fringe resolved correlation function in accordance with the first embodiment.
Figure 3C:
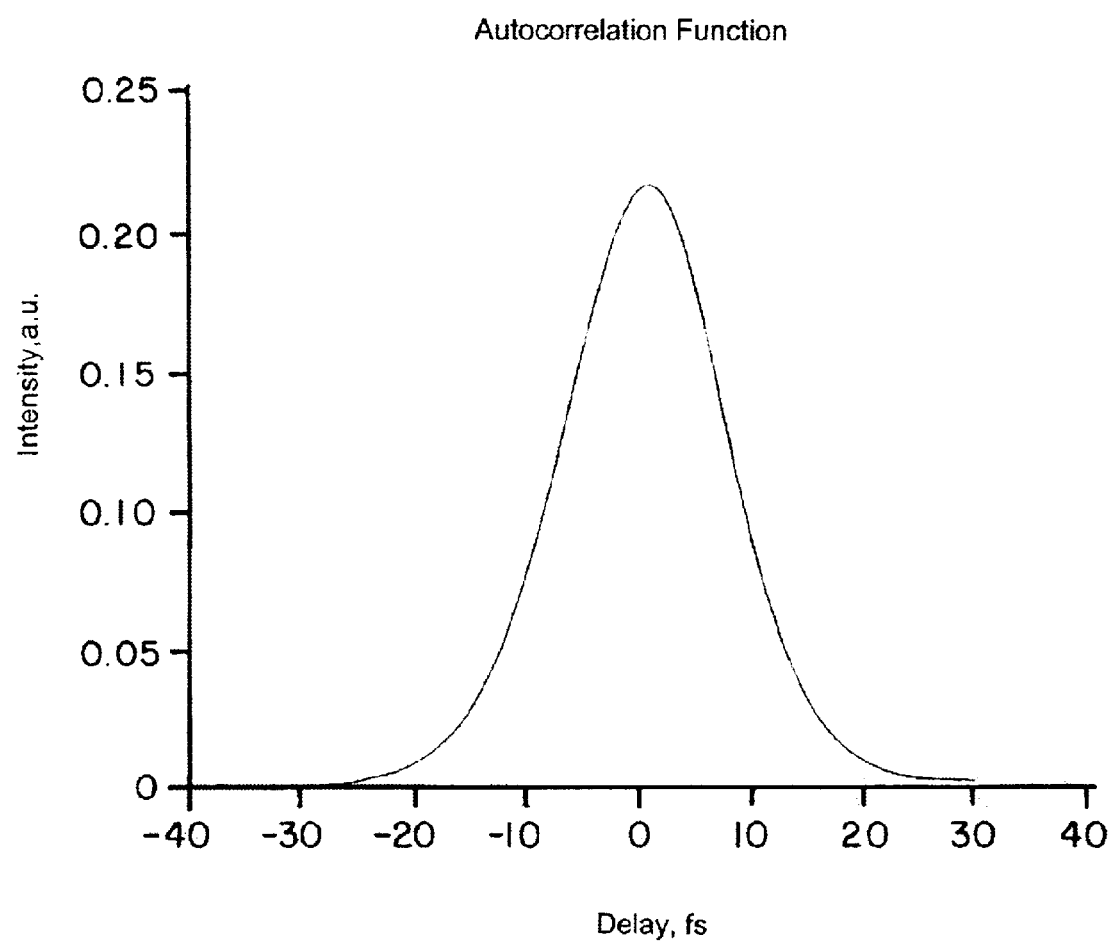
FIG. 3(c) depicts a graph of a numerically simulated intensity autocorrelation function in accordance with the first embodiment.
Figure 3D:
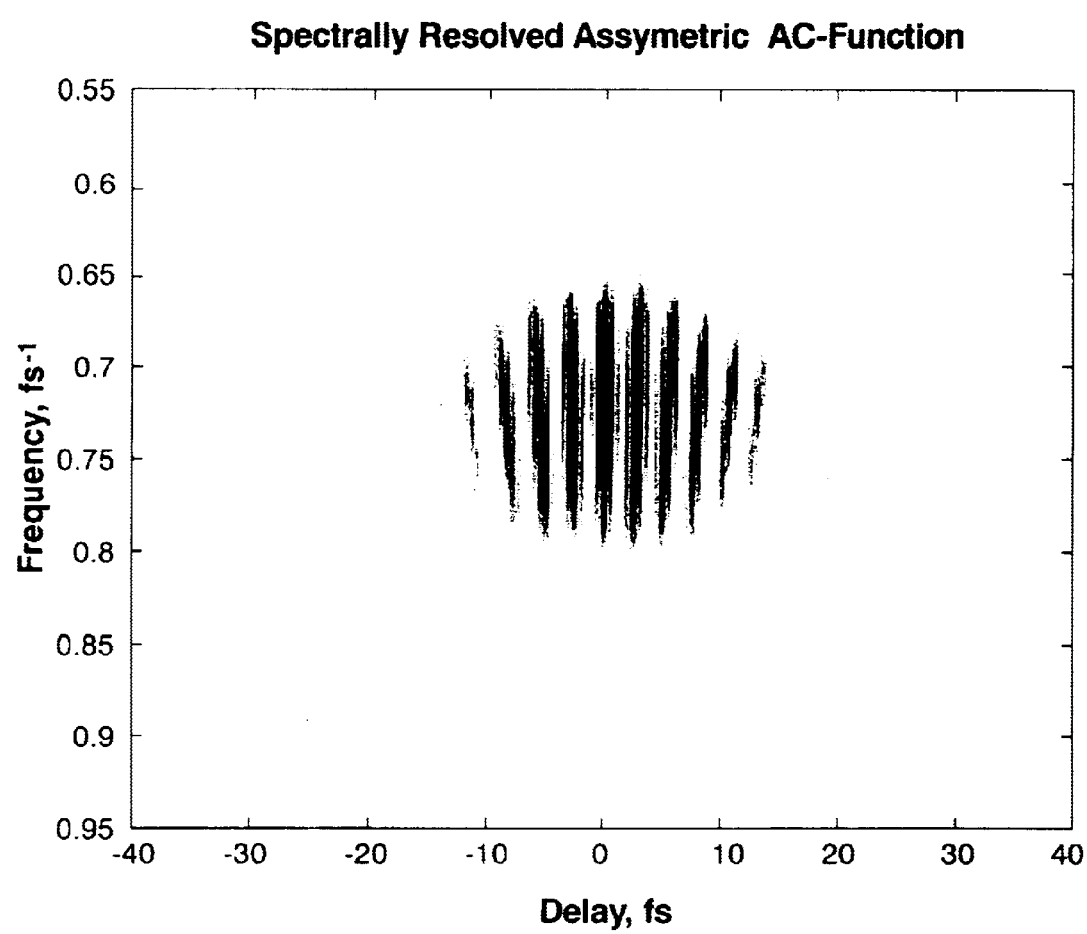
FIG. 3(d) depicts a graph of the function depicted in FIG. 3(a) when spectrally resolved using the second embodiment.
Figure 3E:
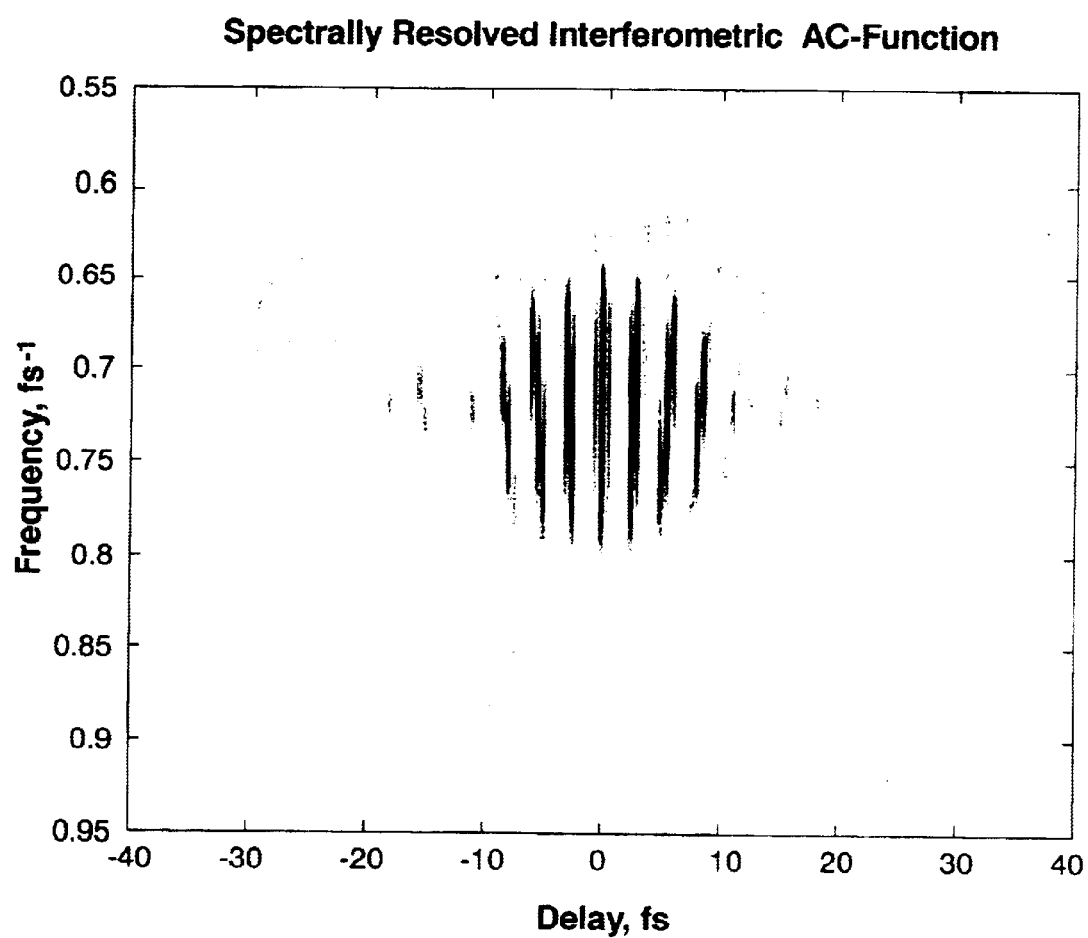
FIG. 3(e) depicts a graph of the function depicted in FIG. 3(b) when spectrally resolved using the second embodiment.
Figure 3F:
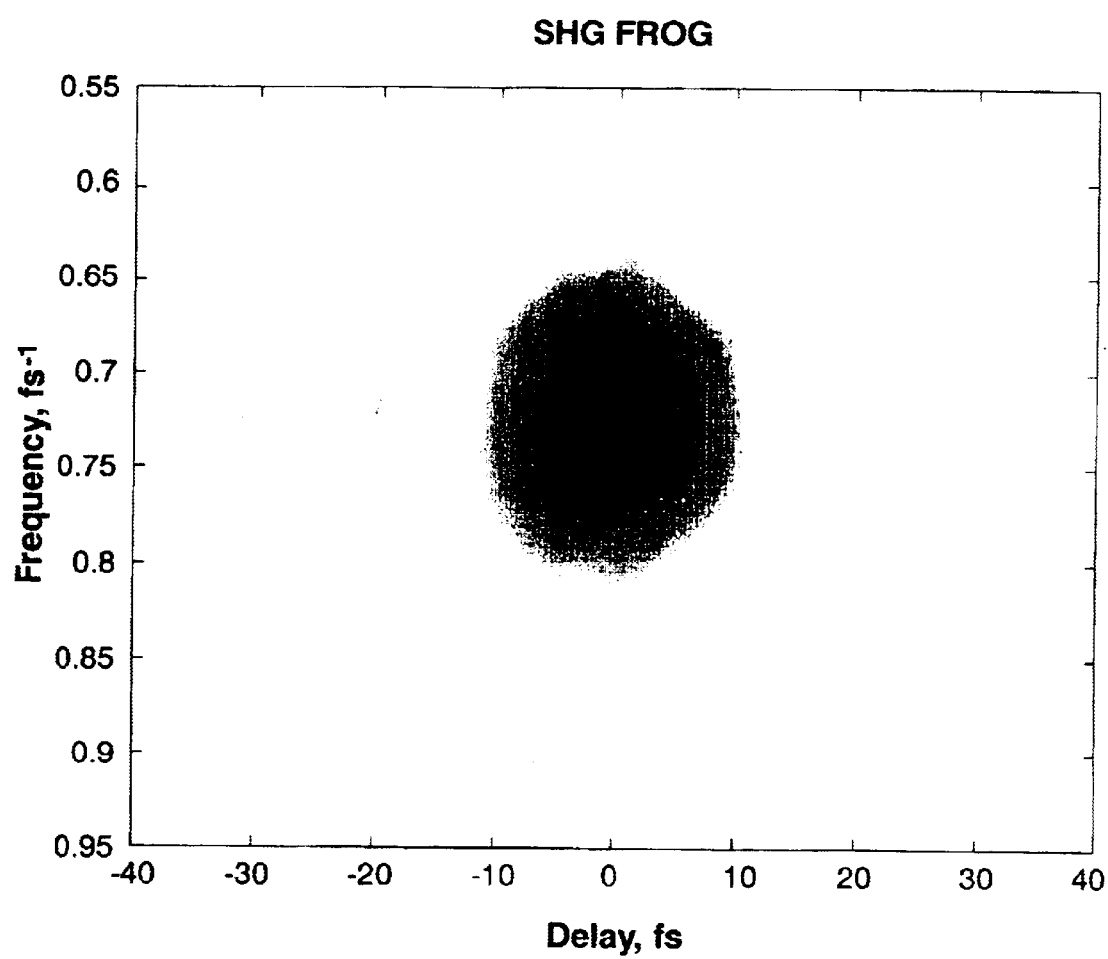
FIG. 3(f) depicts a graph of the function depicted in FIG. 3(c) when spectrally resolved using the second embodiment.
Figure 3G:
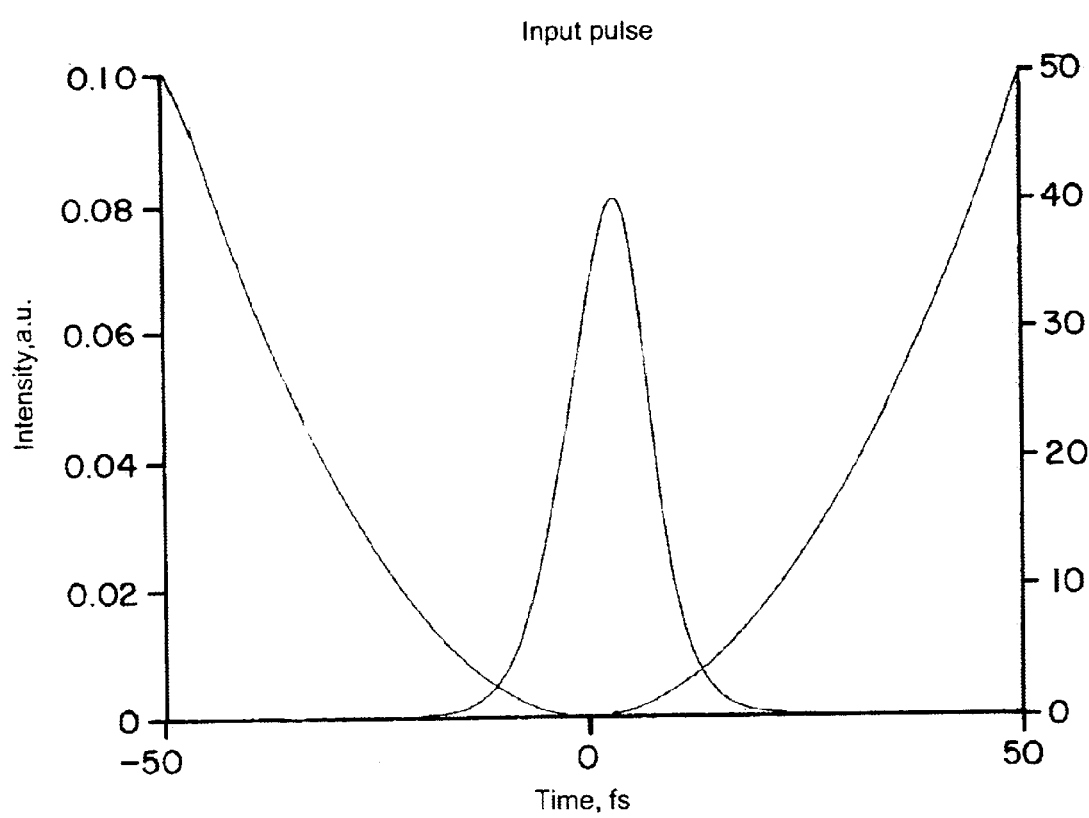
FIG. 3(g) depicts a graph of the time dependent intensity and phase of the pulse used in functions depicted in FIG. 3(a)–FIG. 3(g)

This mode of operation allows a cross-check of data obtained with the SPRINT ASSA diagnostic and data obtained with prior art SHG-FROG diagnostic. Particular ways to implement this are discussed later in this text. FIGS. 3a-3c demonstrate an asymmetric fringe resolved correlation function, symmetric fringe resolved correlation function and intensity autocorrelation function in accordance with a first embodiment of the present invention. FIGS. 3d-3f present corresponding spectrally resolved patterns in accordance with the second embodiment of the present invention numerically simulated for a 10 fs input pulse with quadratic spectral phase, i.e., linear chirp in the time-domain, shown in FIG. 3g.

Spatial nonuniformity of input beams can be directly obtained from the functions $S_{INT}^{(v)}(f,x)$ and $S_{ASSA}^{(v)}(f,x)$. The pattern $S_{ASSA}^{(v)}(f,x)$ integrated over the optical frequency immediately gives the profile of one of the beams in the crystal volume, while $S_{INT}^{(v)}(f,x)$ after the same integration gives a linear interference pattern between two input beams. These beam profile data can be used to numerically correct the intensity of the SPRINT ASSA pattern, if uniform beam intensity can not be achieved.

The measurement of the spatial period of the linear interference pattern at the fundamental frequency $S^{(v)}_{INT}(f, x)$ is essentially a self-calibration procedure of the apparatus which allows the establishment of one-to-one correspondence between the time delay τ and X.

Figure 4:
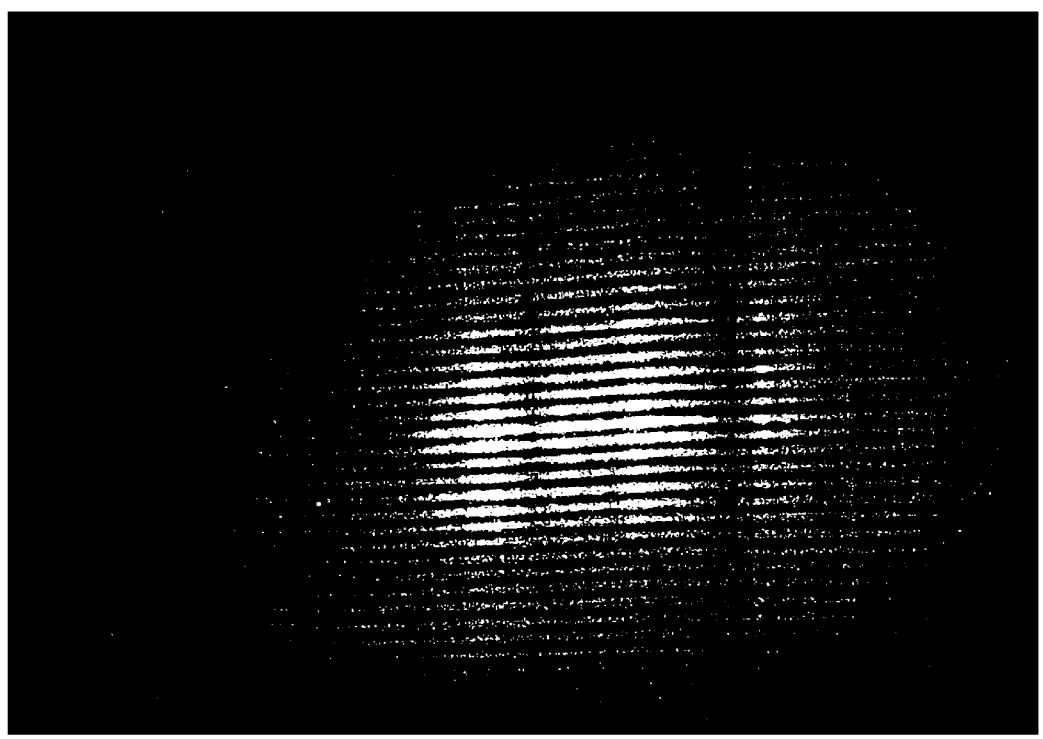
FIG. 4 depicts an image of an experimental interferometric pattern $S_{INT}^{(\omega)}(f,x)$ obtained using second embodiment at a fundamental frequency and suitable to measure optical dispersion.
Figure 6B:
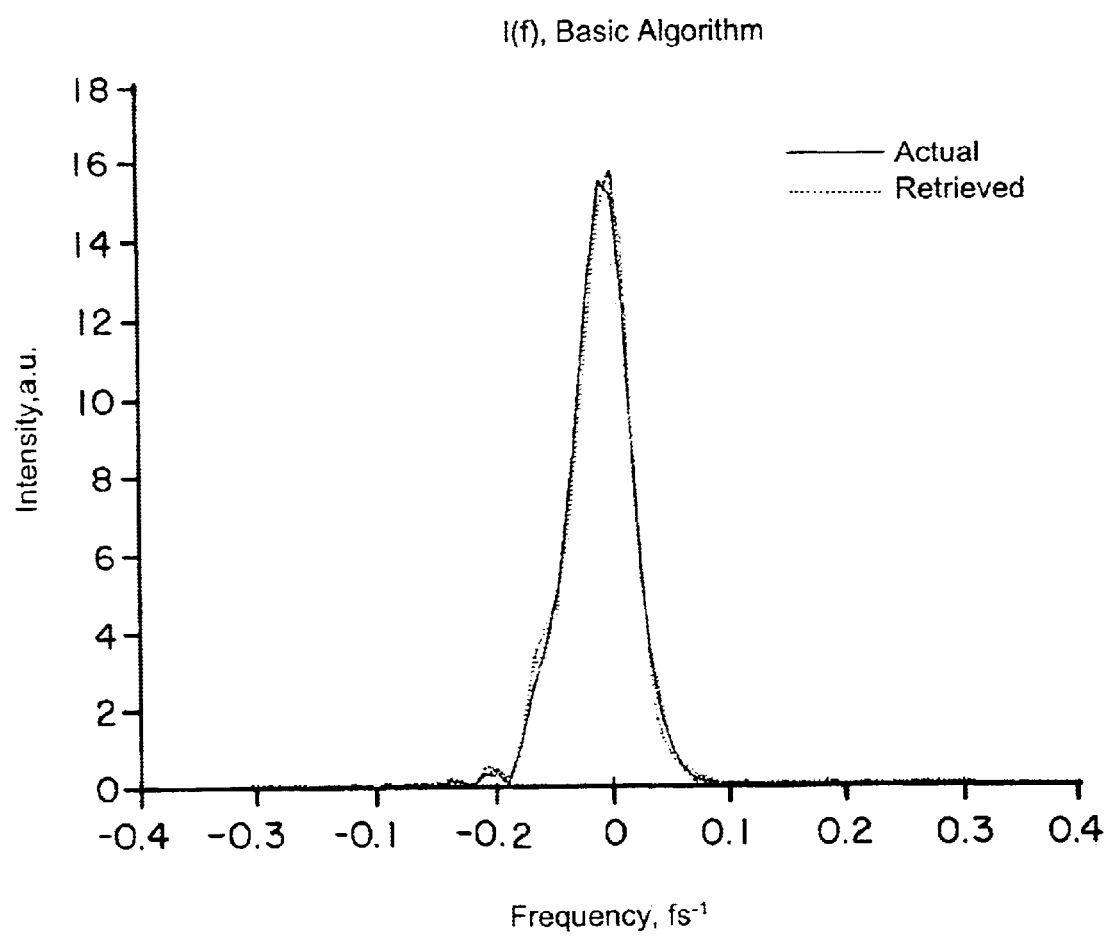
FIG. 6(b) depicts a graph of the pulse spectra of the pattern shown in FIG. 5 using the prior art SHG-FROG algorithm.
Figure 6C:
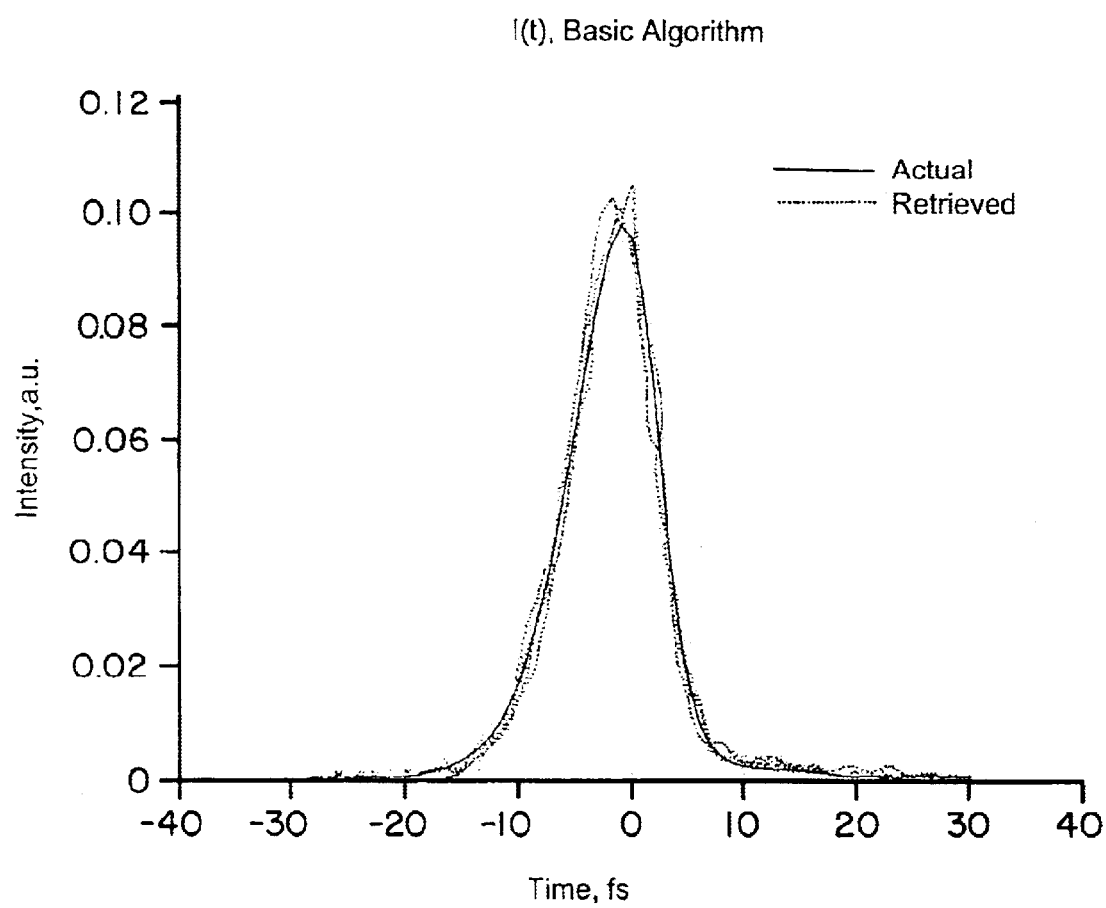
FIG. 6(c) depicts a graph of the pulse intensity of the pattern shown in FIG. 5 using the prior art SHG-FROG algorithm.
Figure 7A:
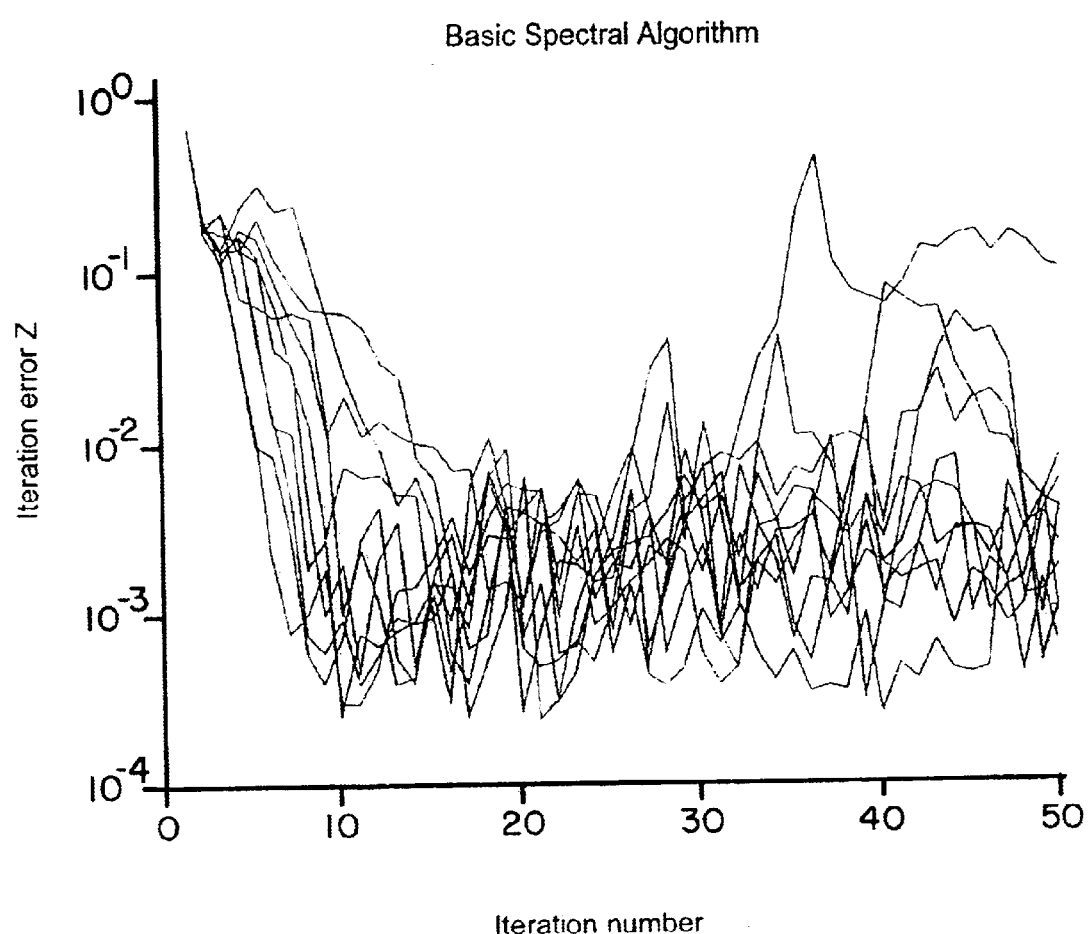
FIG. 7(a) depicts a graph of the pulse retrieval of the pattern shown in FIG. 5 using the spectrum-based SHG-FROG algorithm of the second embodiment.
Figure 7B:
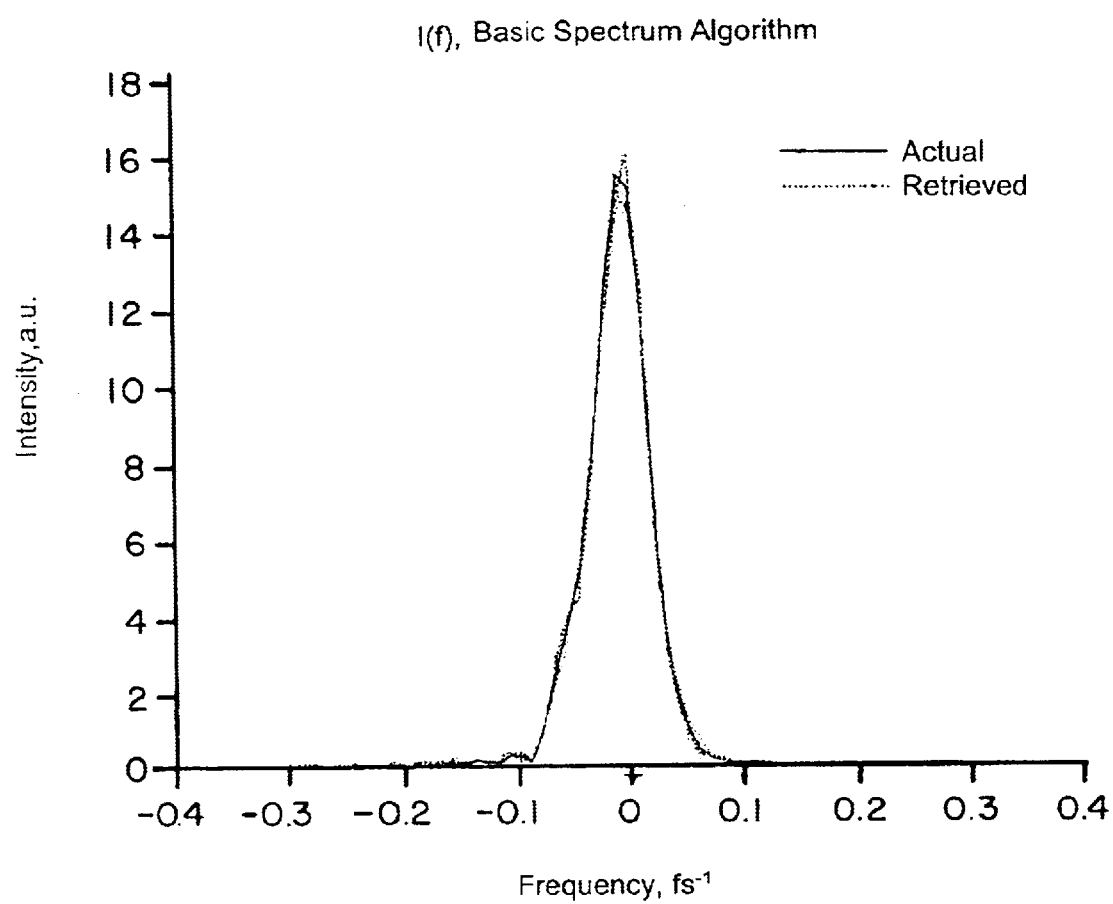
FIG. 7(b) depicts a graph of the pulse spectra of the pattern shown in FIG. 5 using the spectrum-based SHG-FROG algorithm of the second embodiment.
Figure 7C:
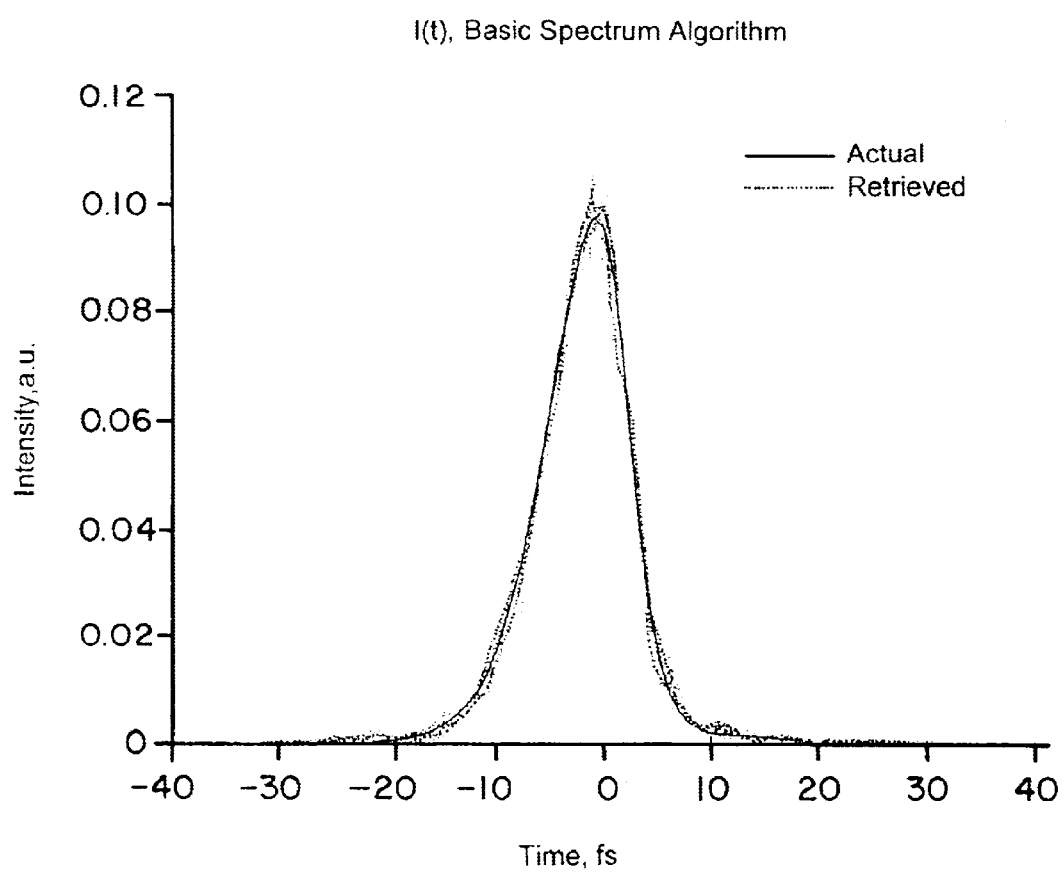
FIG. 7(c) depicts a graph of the pulse intensity of the pattern shown in FIG. 5 using the spectrum-based SHG-FROG algorithm of the second embodiment.
Figure 8C:
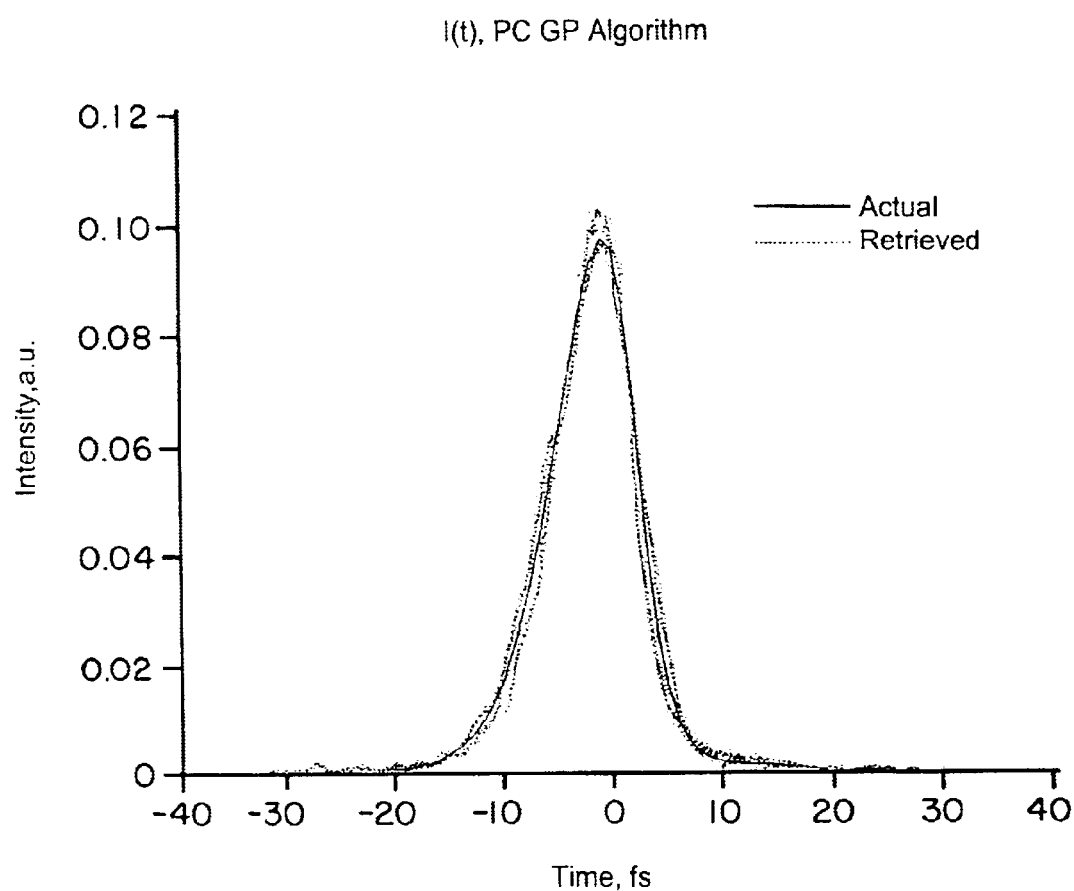
FIG. 8(c) depicts a graph of the pulse intensity of the pattern shown in FIG. 5 using the prior art PC GP algorithm.
Figure 9A:
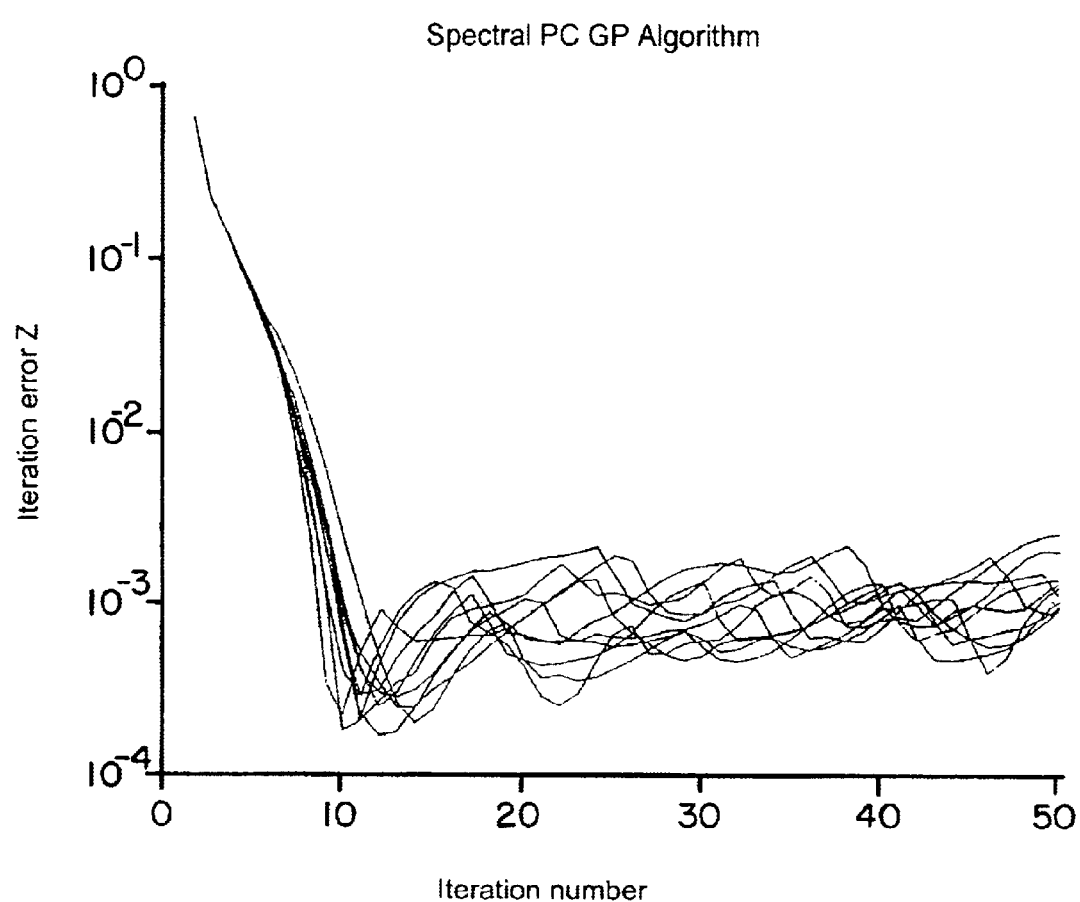
FIG. 9(a) depicts a graph of the pulse retrieval of the pattern shown in FIG. 5 using the spectrum-based PC GP algorithm of the second embodiment.
Figure 9B:
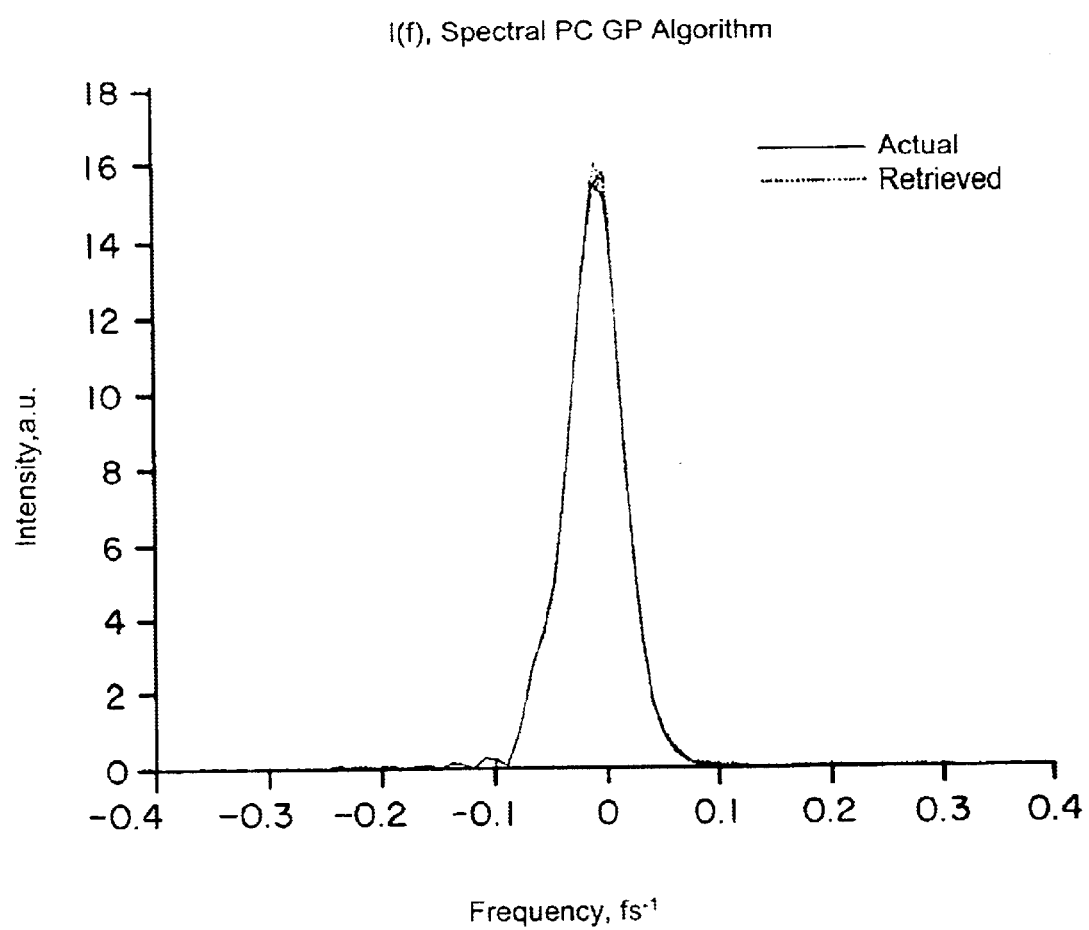
FIG. 9(b) depicts a graph of the pulse spectra of the pattern shown in FIG. 5 using the spectrum-based PC GP algorithm of the second embodiment.
Figure 9C:
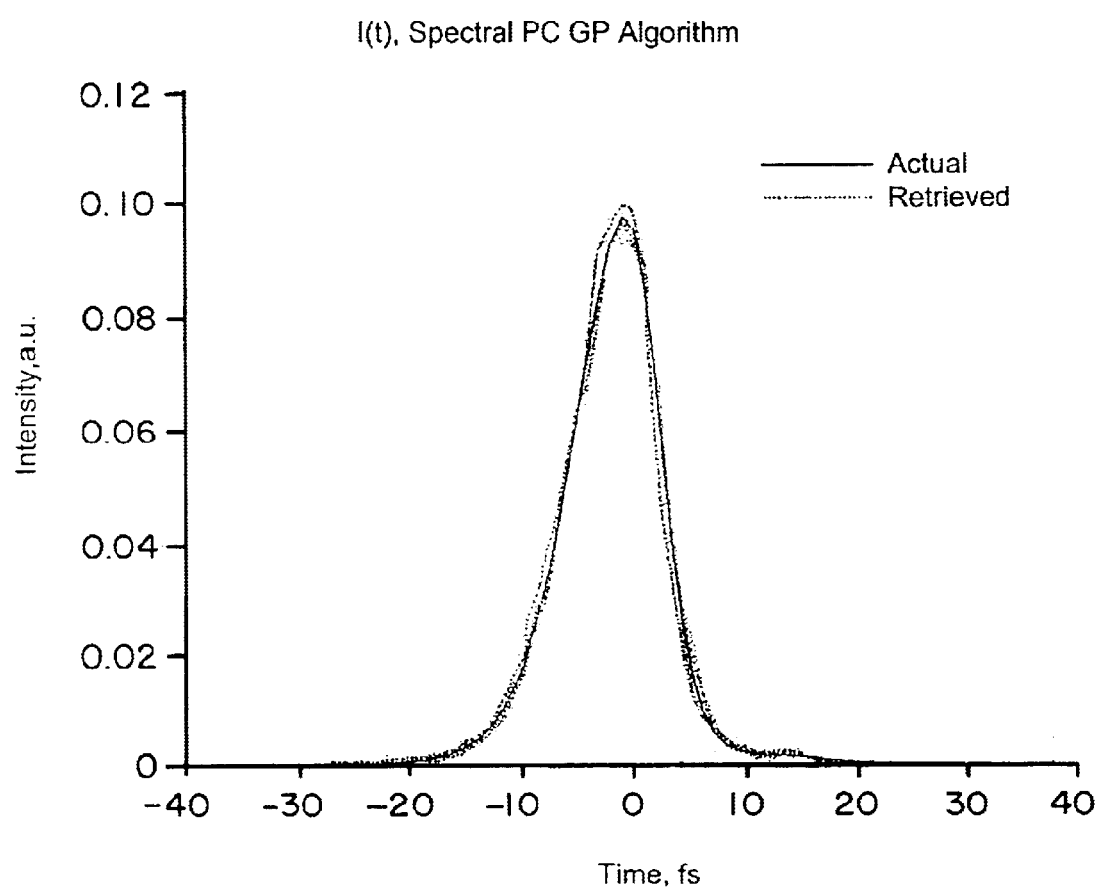
FIG. 9(c) depicts a graph of the pulse intensity of the pattern shown in FIG. 5 using the spectrum-based PC GP algorithm of the second embodiment.

Optical phase difference φ(f) between the beams caused by different amounts of dispersion in the beams can be also detected from the analysis of the same linear interferometric pattern at the fundamental frequency $S_{INT}^{(v)}$. The presence of φ(f) does not change the local period X of the interference pattern, however it results in the local shift of the fringes of the interference pattern along the x-axis. The amount of this shift can be used to actually measure φ(f). A similar procedure can be used to measure an amount of dispersion of a mirror placed in one of the beams as discussed in A. P. Kovacs, K. Osvay, Zs. Bor and R. Szipocs, Optics Letters, 20, 788-790 (1995), herein incorporated by reference in its entirety. Moreover, in the case of cross-correlation measurement, when the beam splitter 270 is replaced with an external beam splitter and one of the input beams in the apparatus propagates through an optical system while the other is used as a reference signal, it is possible to characterize the dispersion of the optical system placed in one of these beams. An example of an experimental interferometric pattern $S_{INT}^{(v)}$ suitable for dispersion measurement is shown in FIG. 4. More details on using $S_{INT}^{(v)}$ for dispersion measurements can be found in S. Nikitin, Aiguo Cui and Qiang Fu "Real-time dispersion measurement of a femtosecond laser amplifier with spectrally resolved interferometer", presented at CLEO-2001, (Baltimore Md., May 2001), herein incorporated by reference in its entirety.

Spatial nonuniformity of spectral content of the beam or "color separation" in the direction along the entrance slit spectrograph results in a variation of the fundamental spectrum across the slit of the spectrograph. If it exists, this variation can be immediately measured using the pattern $S_{ASSA}^{(v)}(f,x)$ acquired by the image detector 294. Color separation perpendicular to the slit (18) does not result in such a variation and can not be measured from $S_{ASSA}^{(v)}(f,x)$.

A spectral self-consistency data check can be performed by comparison of the optical spectrum obtained from $S_{ASSA}^{(v)}(f,x)$ integrated over x and the optical spectrum obtained from the SHG-FROG pattern using the following relationship between the pulse spectrum and $S_{FROG}^{(2v)}(f,\tau)$ as seen in J. Paye, M. Ramaswamy, J. G. Fujimoto and E. P. Ippen "Measurement of the amplitude and phase of ultrashort light pulses from spectrally resolved autocorrelation", Opt. Lett. 18, pp.1946-1948 (1993). ("the Paye reference"), herein incorporated by reference in its entirety:

$$\{\int I(f')e^{-2\pi if't}df'\}^2 = \int\int S_{FROG}^{(2v)}(f,\tau)e^{-2\pi ift}d\tau df \quad \text{(Eq. 13)}$$

in cases when $\int I(f')e^{-2\pi if't}df' \geq 0$ this expression can be rewritten as:

$$I(f) = \int e^{2\pi ift}\{\int\int S_{FROG}^{(2v)}(f,\tau)e^{-2\pi ift}d\tau df\}^{1/2}dt \quad \text{(Eq. 14)}$$

Once the set of acquired data satisfies these checks, they can be used for numerically intensive data processing to retrieve an analytic signal of the pulse, as described below.

It is assumed that the correspondence between x and τ in the acquired patterns has been established as described above. As was discussed above, the apparatus simultaneously acquires the fundamental optical spectrum of the pulse $I(f)=|\int E(t)\exp\{2\pi ift\}dt|^2$ and either its SHG-FROG pattern $S_{FROG}^{(2v)}(f,\tau)$ given by (Eq. 12) or SPRINT ASSA pattern $S_{ASSA}^{(2v)}(f,\tau)$, given by (Eq. 8). Any of these patterns can be used to calculate an analytic signal of the input pulse using proper algorithms. A mixed approach will now be discussed in which the SHG-FROG pattern and the fundamental optical spectrum are used to calculate the analytic signal of the laser pulse.

As was mentioned earlier, SHG-FROG does not allow determination of an overall sign of the optical pulse phase. The final step of pulse characterization is therefore removal of this ambiguity. This step can be performed by comparison of an experimentally acquired SPRINT ASSA pattern with the result of calculation of the same pattern based on Eq. 8. Additionally, the comparison procedure allows a final self-consistency data check and additionally ensures reliability of the retrieved analytic signal.

A standard SHG-FROG method is based on a computational algorithm as described in the Trebino, De Long and Rodriguez references which iteratively varies both pulse shape and its phase until the numerically calculated SHG-FROG pattern matches the experimentally acquired pattern with a predefined accuracy. However, the optical spectrum of the pulse I(f) can be either directly calculated from $S_{ASSA}^{(v)}(f,x)$ using (Eq. 13, 14) or simply measured independently, so that only the frequency dependent phase of the electric field φ(f) remains to be determined. The method described herein is based on algorithms which take into account the optical spectrum of the pulse in addition to the spectrally resolved autocorrelation pattern. The algorithms described herein are improvements to standard algorithms originally published in the Trebino, DeLong and Rodriguez references as well as J. Paye, M. Ramaswamy, J.

G. Fujimoto and E. P. Ippen "Measurement of the amplitude and phase of ultrashort light pulses from spectrally resolved autocorrelation", Opt. Lett. 18, pp. 1946-1948 (1993) (the "Paye reference"), herein incorporated by reference in its entirety.

The basic algorithm to retrieve E-field from the SHG-FROG pattern in the case of sum-frequency generation was first described in the Trebino reference without spectral data included into the algorithm and in the Paye reference where the spectral data were included into the algorithm. However, the authors of the Paye reference evaluated spectral data from the acquired SHG-FROG image using an analytic expression (Eq. 13, 14). For this reason, their method is susceptible to the experimental noise of the acquired SHG-FROG image. In the description of the present invention, it is assumed that the spectrum of the pulse is measured experimentally.

The spectrum based algorithm includes the following steps:

1. Using an initial estimate for the frequency dependent optical phase $\phi(f)$ and measured spectrum intensity $I(f)$ an amplitude of the light pulse is constructed as $$E(f)=\sqrt{\sqrt{I(f)}}e^{i\phi(f)} \quad \text{(Eq. 15)}$$

2. The SHG-FROG signal amplitude for the calculated $E(f)$ is calculated:

$$A_{FROG}(f,\tau)=\int \sqrt{\sqrt{I(v-f)I(f)}}e^{i[\phi(v-f)+\phi(f)]}e^{-2\pi i v \tau}dv \quad \text{(Eq. 16)}$$

3. Use experimentally measured $S_{FROG}^{(2v)}(f,\tau)$ to replace calculated $A_{FROG}(f,\tau)$ with $$\tilde{A}_{FROG}(f,\tau) = \sqrt{S_{FROG}^{(2v)}(f,\tau)} \frac{A_{FROG}(f,\tau)}{|A_{FROG}(f,\tau)|} \quad \text{(Eq. 17)}$$

4. Calculate new electric field using the equation:

$$\tilde{E}(f)=\int \tilde{A}_{FROG}(v,\tau)e^{2\pi i f \tau}d\tau dv \quad \text{(Eq. 18)}$$

and find the new optical phase $$\tilde{\phi}(f) = \frac{\tilde{E}(f)}{|\tilde{E}(f)|}.$$

Go back to step 1 with the newly calculated phase to start the next iteration. At each iteration an error defined as $$Z=\int\int \{|A_{FROG}(f,\tau)|^2-S_{FROG}^{(2v)}(f,\tau)\}^2 df d\tau \quad \text{(Eq. 19)}$$

is calculated to measure the difference between the SHG-FROG pattern generated by the algorithm at the current iteration and the numerically simulated "experimentally acquired" SHG-FROG pattern. It is also assumed that both the experimentally acquired pattern $S_{FROG}^{(2v)}(f,\tau)$ and $|A_{FROG}(f,\tau)|^2$ are properly normalized, so that $\int\int S_{FROG}^{(2v)}(f,\tau)df d\tau=\int\int |A_{FROG}(f,\tau)|^2 df d\tau=1$. Iterations are continued until a sufficiently small value of Z is obtained. If necessary, once $\phi(f)$ and $I(f)$ are known, the time dependent phase and intensity of the light pulse $\phi(t)$ and $E(t)$ can be calculated using inverse Fourier transform.

The original version of the other algorithm, also known as "PC GP," without spectrum inclusion is believed to have been published in the Rodriguez reference where it was implemented in the time-domain. The algorithm described herein, however, is implemented in the frequency domain, which simplifies inclusion of the optical spectrum in the algorithm. In the algorithm according to the present invention, the use of (Eq. 18) at step 4 of the basic algorithm is replaced with a different procedure to calculate $\tilde{E}(f)$ from $\tilde{A}_{FROG}(f,\tau)$. To understand this procedure, first assume that the pulse spectrum $E(f)$ and SHG-FROG amplitude $A_{FROG}(f,\tau)$ are somehow retrieved and known. In this case, it is possible to evaluate a corresponding Fourier image $A_{FROG}(v,f)=\int A_{FROG}(f,\tau)e^{2\pi i v \tau}d\tau$. It is straightforward to show that $A_{FROG}(v,f)$ can be also calculated directly from $E(f)$, as $A_{FROG}(v,f)=E(v-f)E(f)$. In the case of numeric representation, $E(f)$ corresponds to a vector $[E_1\ E_2\ \ldots\ E_N]$ where $E_j=E(f_0+j\delta)$ are sampled amplitudes in the spectral domain. The Fourier transformed SHG-FROG amplitude $A_{FROG}(v,f)=E(v-f)E(f)$ is then represented by a 2N−1×N matrix:

$$\{A_{ij}\} = \begin{bmatrix} E_1E_1 & 0 & 0 & \cdots & 0 \\ E_1E_2 & E_2E_1 & 0 & \cdots & 0 \\ E_1E_3 & E_2E_2 & E_3E_1 & \cdots & 0 \\ \vdots & \vdots & \vdots & \ddots & \vdots \\ E_1E_N & E_2E_{N-1} & E_3E_{N-2} & \cdots & E_NE_1 \\ 0 & E_2E_N & E_3E_{N-1} & \cdots & E_NE_2 \\ 0 & 0 & E_3E_N & \cdots & E_NE_3 \\ \vdots & \vdots & \vdots & \ddots & \vdots \\ 0 & 0 & 0 & \cdots & E_NE_N \end{bmatrix} \quad \text{(Eq. 20)}$$

The elements of this matrix can be easily rearranged to form a N×N matrix, corresponding to the outer product of the vector $[E_1\ E_2\ \ldots\ E_N]$ on itself:

$$\{H_{ij}\} = \begin{bmatrix} E_1 \\ E_2 \\ \vdots \\ E_N \end{bmatrix} \cdot [E_1\ E_2\ \cdots\ E_N] = \begin{bmatrix} E_1E_1 & E_1E_2 & \cdots & E_1E_N \\ E_2E_1 & E_2E_2 & \cdots & E_2E_N \\ \vdots & \vdots & \ddots & \vdots \\ E_NE_1 & E_NE_2 & \cdots & E_NE_N \end{bmatrix} \quad \text{(Eq. 21)}$$

In reality, $\tilde{A}_{FROG}(f,\tau)$ obtained at a particular iteration does not necessarily correspond to a certain $\tilde{E}(t)$. It is still possible to calculate $\{\tilde{A}_{ij}\}$ and rearrange its components to form a corresponding matrix $\{\tilde{H}_{ij}\}$ using $\tilde{A}_{FROG}(v,f)$ calculated at a particular iteration. Most likely, the resulting $\{\tilde{H}_{ij}\}$ may not be presented as the outer product of a particular vector $[E_1\ E_2\ \ldots\ E_N]$, however, it can be presented as a sum of outer products with weights $\lambda_k$:

$$\{\tilde{H}_{ij}\} = \sum_k \begin{bmatrix} E_1^{(k)} \\ E_2^{(k)} \\ \vdots \\ E_N^{(k)} \end{bmatrix} \cdot \lambda_k \cdot [E_1^{(k)}\ E_2^{(k)}\ \cdots\ E_N^{(k)}] \quad \text{(Eq. 22)}$$

To find vectors $E^{(k)}$ and their weights $\lambda_k$ corresponding to $\{\tilde{H}_{ij}\}$ it is possible to use a linear algebraic procedure known as singular value decomposition as described in W. H. Press, S. A. Teukolsky, W. T. Vetterling and B. P. Flannery, "Numerical Recepies in C", New York, N.Y.: Cambridge University Press (1992), herein incorporated by reference in its entirety. For the purpose of an iterative algorithm, either the vector with the largest $\lambda_k$ or a certain linear combination of few vectors with the largest values of $\lambda_k$ can be used as the electric field for the next iteration. The results presented below were obtained using the vector with the largest $\lambda_k$.

This vector is called a "principal component", while the procedure of its calculation from the SHG-FROG amplitude can be considered as a generalized projection in a sense specified in the Rodriguez reference. For this reason, the authors of the Rodriguez reference named this method as Principal Component Generalized Projection' ("PC GP").

The spectral modification of the PC GP algorithm described below allows simple inclusion of the independently measured optical spectrum I(f) (into the iterative algorithm. Similar to the basic SHG-FROG algorithm, this is performed by using the phase of the electric field only:

$$\tilde{\phi}(f) = \frac{\tilde{E}(f)}{|\tilde{E}(f)|}.$$

In this case, the E-field for the next iteration is defined as $\tilde{E}(f) = \sqrt{I(f)}e^{i\tilde{\phi}(f)}$. The inclusion of the optical spectrum into the calculation is a significant improvement of the original PC GP algorithm suggested in the Rodriguez reference. As described below, the major advantage of the presented spectrum-based PC GP algorithm is its improved convergence. Another important advantage of the algorithm is its reliability in cases when the SHG-FROG image is affected by noise, which is a common problem in any real experiment.

The performance of the spectrum based algorithms described above is compared below with the performance of a prior art SHG-FROG algorithm in the Trebino reference and with the performance of the PC GP algorithm in the Rodriguez reference relying on $S_{FROG}^{(2\nu)}(f,\tau)$ only. To test the performance of the algorithms SHG-FROG patterns $S_{FROG}^{(2\nu)}(f,\tau)$ were generated numerically using a 64×64 grid size for several different pulse shapes. To simulate experimental noise, a random noise uniformly distributed in the range of ±0.2% of the maximum intensity with zero mean value was added to the generated patterns. This amount of image noise roughly corresponds to an ideal linear image detector with signal-to-noise ratio ~48 dB, which is typical for a video-output of an analog CCD camera. For the results presented here, an initial guess for the first iteration of spectrum-based algorithms was calculated as:

$$E(f) = e^{i\Psi(f)}I(f) \qquad \text{(Eq. 23)}$$

where $\Psi(f)$ was 'randomly drifting' spectral phase, generated as $$\Psi(f_{min} + k\Delta f) = \Psi_k = 2\pi A \sum_{i=1}^{k} \sigma_i, \quad k = 1, 2, 3 \ldots \qquad \text{(Eq. 24)}$$

and random quantity $\sigma_i$ is uniformly distributed in the interval from −0.5 to 0.5, original phase value $\Psi(f_{min})=0$ and $A=10^{-2}$. For standard algorithms, an inverse Fourier transform of (Eq. 23) was used. Other methods or approaches to generate initial guesses, such as random E(t) or E(f) were also used with qualitatively similar results.

The results obtained for an asymmetric pulse with non-linear phase modulation is shown in FIGS. 5–9. Qualitatively similar results were observed for a variety of other input pulses, including strongly chirped pulses with pedestal, high-contrast single pulses and double-peaked pulses. A sequence of randomly noised images $S_{FROG}^{(2\nu)}(f,\tau)$ and initial guesses were generated for the same input pulse and repetitively used for data retrieval using all algorithms described above. FIG. 5 demonstrates a numerically simulated SHG-FROG pattern corresponding to the pulse before random noise is added to the image. FIGS. 6a, 7a, 8a and 9a demonstrate an iteration error Z defined by (Eq. 19) for the first 50 iterations for each of the discussed algorithms. Retrieved pulse spectra and intensities are shown with dotted lines for the prior art SHG-FROG (FIGS. 6b, 6c), spectrum-based SHG-FROG (FIGS. 7b, 7c), prior art PC GP (FIGS. 8b, 8c) and spectrum-based PC GP (FIGS. 9b, 9c). An actual spectrum of the pulse spectrum and its time-dependent intensity are also shown in these figures with solid lines. As can be seen, data retrieved with the spectrum-based algorithms are more reliable, while convergence of the spectrum-based PC GP algorithm is typically the fastest.

It is interesting to note that for some low-contrast or strongly modulated input pulses that were used for the tests, the basic algorithm simply fails to converge, while the spectrum-based basic algorithm does not strictly converge, but occasionally generates good 'guesses' characterized by a very small value of Z as defined by (Eq. 19). As for the spectrum-based PC GP algorithm, it consistently converges to reliable results in all cases that were tested. For high-contrast single pulses, all these algorithms converge, but in this case the PC GP algorithms converge faster and provide more reliable retrieval results.

The new apparatus and method also allow:

1) Acquiring either a spectrally resolved interferometric asymmetric autocorrelation function or an SHG-FROG pattern, depending on the position of a blocking mask;
2) Performing self-calibration over time delay by measuring the period of the interference patterns at both fundamental and harmonic wavelengths;
3) Ensuring absence of color separation in the characterized beam;
4) Acquiring a fundamental optical spectrum simultaneously with spectrally resolved autocorrelation patterns
5) Measuring an amount of relative optical dispersion between the beams in the correlator mode;
6) A cross-correlation modification of this method can be used to measure and monitor optical dispersion of an optical system, in particular a femtosecond laser amplifier.
7) Eliminating erroneous measurements due to alignment errors, as the acquired data allow self-consistency checks and sophisticated pre-processing.
8) Spectrum-based pulse retrieval algorithms use the advantages of the invented apparatus and method. These algorithms include an independently measured optical spectrum as an additional constraint and compared to previously published algorithms they have the following advantages:
   1) Substantially improved convergence of the algorithm;
   2) Reduced sensitivity of the retrieved pulse to the experimental noise in the SHG-FROG pattern;
   3) The result of the calculation immediately shows spectrally dependent phase, which is helpful for dispersion control of femtosecond laser systems.

Similar modifications could be also made to optical correlators based on nonlinearities other than second harmonic generation, such as polarization gating or self-diffraction.

Thus, while there have been shown, described, and pointed out fundamental novel features of the invention as applied to a preferred embodiment thereof, it will be understood that various omissions, substitutions, and changes in the form and details of the devices illustrated, and in their operation, may be made by those skilled in the art without departing from the spirit and scope of the invention. For example, it is expressly intended that all combinations of those elements steps which perform substantially the same, function in substantially the same way, to achieve the same results are within the scope of the invention. Substitutions of elements from one described embodiment to another are also fully intended and contemplated. It is also to be understood that the drawings are not necessarily drawn to scale, but that they are merely conceptual in nature. It is the intention, therefore, to be limited only as indicated by the scope of the claims appended hereto.

What is claimed is:

1. A system that characterizes a light beam, comprises:
a nonlinear crystal receiving a first fundamental beam and a second fundamental beam and generating a first second harmonic beam, a second second harmonic beam and a sum frequency beam, the first fundamental beam and the second fundamental beam having a fundamental optical carrier frequency $v_0$, the first fundamental beam and the second fundamental beam intersecting the nonlinear crystal at an angle $\alpha$, the first fundamental beam optically delayed from the second fundamental beam, the optical nonlinearity of the crystal enabling a generation of the first second harmonic beam, second harmonic beam, and the sum frequency beam, a thickness of the nonlinear crystal ensures a phase matching for the first second harmonic beam, the second second harmonic beam and the sum frequency beam;
a lens receiving the first second harmonic beam, the second second harmonic beam, and the sum frequency beam and refracting the first second harmonic beam, the second second harmonic beam, and the sum frequency beam;
a mask, the mask optionally selectively blocking at least one of the first second harmonic beam and the second second harmonic beam; and
an image detector receiving the sum frequency and at least one of the first second harmonic beam and the second second harmonic beam and registering an asymmetric autocorrelation function, the asymmetric autocorrelation function determining a sign of a phase modulation of at least one of the first fundmental beam and the second fundamental beam.

2. A system as in claim 1, wherein:
a thickness of the nonlinear crystal ensures a phase matching for the first second harmonic beam, the second second harmonic beam and the sum frequency beam.

3. A system as in claim 1, wherein the optical delay of the first fundamental beam and the second fundamental beam is:

$$\tau=2\sin(\alpha/2)x/c;$$

wherein $\alpha$ represents the intersecting angle of the first fundamental beam and the second fundamental beam; x represents a vertical coordinate position at a surface of the crystal; c represents the speed of light in a vacuum.

4. A system as in claim 3, wherein the optical delay of the first fundamental beam and the second fundamental beam is adjustable.

5. A system as in claim 4, wherein at least one of a scanning optical delay line and a beam splitter adjusts the optical delay of the first fundamental beam and the second fundamental beam.

6. A system as in claim 1, wherein the asymmetric correlation function is:

$$I_{ACC}(\tau) \propto \int |2E_1(t+\tau)E_2(t)+E_2(t)|^2 dt$$

wherein $E_1(t)$ represents a complex analytic signal of the first fundamental beam; $E_2(t)$ represents a complex analytic signal of the second fundamental beam; and $\tau$ represents optical delay between the first fundamental beam and the second fundamental beam.

7. A system as in claim 1, further comprises:
an imaging optical spectrograph, the imaging optical spectrograph having an entrance slit, the slit of the optical spectrograph receiving the sum frequency beam and at least one of the first second harmonic beam and the second second harmonic beam, the imaging optical spectrograph measuring an optical spectra of the sum frequency fundamental beams; and at least one of the first second harmonic beam and the second second harmonic beam.

8. A system as in claim 1, further comprises:
a beam splitter, the beam splitter dividing the light beam into the first fundamental beam and the second fundamental beam having the first optical frequency $v_0$.

9. A method for characterizing a light pulse, comprising:
delaying optically a first fundamental linear beam and a second fundamental linear beam in a crystal;
introducing nonlinear interaction between the first fundamental beam and the second fundamental beam through a nonlinear mechanism; and,
introducing asymmetry to at least one of the first nonlinear beam and the second nonlinear beam through an asymmetry introducing device.

10. A method as in claim 9, wherein the optical delay of the first fundamental beam and the second fundamental beam is:

$$\tau=2\sin(\alpha/2)x/c;$$

wherein $\alpha$ represents the intersecting angle of the first fundamental beam and the second fundamental beam; x represents a vertical coordinate position at a surface of the crystal; c represents the speed of light in a vacuum.

11. A method as in claim 9, wherein the asymmetry imputed results in an auto-correlation function given by:

$$I_{AAC}(\tau) \propto \int |2E(t+\tau)E(t)+E^2(t)|^2 dt$$

wherein E(t) represents a time domain analytic signal of the light beam; and $\tau$ represents optical delay between the first fundamental beam and the second fundamental beam.

12. A method as in claim 9, wherein the nonlinear mechanism is at least one of second harmonic generation, polarization gating, and self-diffraction.

13. A method as is in claim 9, wherein the asymmetry introducing device is at least one of a mask that blocks one nonlinear beam, an optical attenuator that attenuates at least one nonlinear beam, and a phase modulator that phase shifts at least one nonlinear beam.

14. A method as in claim 9, further comprising measuring an optical cross-correlation of the light beam.

15. A system that characterizes a light beam, comprises:
a beam splitter, the beam splitter receiving a light beam of a fundamental optical carrier frequency $v_0$, and splitting the light beam into a first fundamental beam and a second fundamental beam of fundamental optical carrier frequency $v_0$;

a plurality of mirrors receiving the first fundamental beam and the second fundamental beam and reflecting the first fundamental beam and the second fundamental beam;

a nonlinear crystal, the reflected first fundamental beam and the second fundamental beam intersecting the crystal at an angle $\alpha$, the crystal inducing optical delay between the first fundamental beam and the second fundamental beam, the crystal partially transmitting the first fundamental beam and the second fundamental beam, the crystal partially converting the first fundamental beam into a first second harmonic beam and partially converting the second fundamental beam into a second second harmonic beam having a double optical carrier frequency $2v_0$, the crystal generating a sum frequency beam;

a lens, the lens receiving from the crystal the first fundamental beam, second fundamental beam, the first second harmonic beam, the second second harmonic beam and the sum frequency beam and refracting the first fundamental beam, second fundamental beam, the first second harmonic beam, the second second harmonic beam and the sum frequency beam;

a movable mask, the mask having three positions, a first position blocking the first fundamental beam, the first second harmonic beam, the second fundamental beam and the second second harmonic beam, a second position blocking at least one of a first fundamental beam/first harmonic beam pair and a second fundamental beam/second harmonic beam pair, and a third position blocking none of the first fundamental beam, second fundamental beam, the first second harmonic beam, the second second harmonic beam and the sum frequency beam.

16. A system as in claim 15, wherein:
a thickness of the crystal allows phase matching.

17. A system as in claim 15, further comprises:
wherein the optical delay of the first fundamental beam and the second fundamental beam is:

$\tau = 2\sin(\alpha/2)x/c$;

wherein $\alpha$ represents the intersecting angle of the first fundamental beam and the second fundamental beam; x represents a vertical coordinate position at a surface of the crystal; c represents the speed of light in a vacuum.

18. A system as in claim 17, further comprises:
an imaging spectrograph.

19. A system as in claim 18, wherein the imaging spectrograph further comprises:
an entrance slit, a collimating spherical mirror, a diffraction grating, and a first image detector and a second image detector.

20. A system as in claim 19, wherein the entrance slit of the imaging spectrograph receives the first fundamental beam, second fundamental beam, the first second harmonic beam, the second second harmonic beam and the sum frequency beam, exclusive of the first fundamental beam, second fundamental beam, the first second harmonic beam, the second second harmonic beam and the sum frequency beam blocked by the movable mask.

21. A system as in claim 20, wherein the image detectors register the first fundamental beam, second fundamental beam, the first second harmonic beam, the second second harmonic beam and the sum frequency beam received by the entrance slit and resolved spectrally.

22. A system as in claim 21, wherein the first image detector registers a pattern, the pattern at a fundamental optical frequency of $v_0$, and the second image detector registers a pattern, the pattern at a doubled optical frequency of $2v_0$.

23. A system as in claim 15, wherein when the movable mask is in a second position, the second image detector registers a spectrally resolved SPRINT ASSA two-dimensional pattern.

24. A system as in 23, wherein the a spectrally resolved SPRINT ASSA two-dimensional pattern is according to:

$$S_{ASSA}^{(2v)}(f,x) \to S_{ASSA}^{(2v)}(f,\tau) \propto |\int \{2E(t+\tau)E(t)+E^2(t)\}\exp(2\pi ift)dt|^2$$

wherein E(t) represents a time domain analytic signal of the light beam; and $\tau$ represents optical delay between the first fundamental beam and the second fundamental beam.

25. A system as in claim 24, wherein the spectrally resolved SPRINT ASSA two-dimensional pattern comprises a first contribution, a second contribution, and a third contribution, the first contribution comprising an ordinary SHG-FROG pattern, the second contribution comprising an energy spectrum of a second harmonic of the first fundamental beam and the second fundamental beam, and the third contribution comprising an asymmetric interferometric pattern.

26. A system as in claim 25, wherein an analytic signal corresponding to the interferometric pattern is proportional to a product of a FROG signal and an amplitude spectrum of a second harmonic field.

27. A system wherein as in claim 19, when the movable mask is in a third position, the second image detector registers a nonlinear interferometric pattern at a second harmonic frequency and the first image detector registers a linear interferometric pattern at a fundamental frequency.

28. A system as in claim 27, wherein the second image detector registers the nonlinear interferometric pattern according to:

$$S_{INT}^{(2v)}(f,x) \to S_{INT}^{(2v)}(f,\tau) \propto |\int \{E^2(t+\tau)2E(t+\tau)E(t)+E^2(t)\}\exp(2\pi ift)dt|^2$$

wherein E(t) represents a time domain analytic signal of the light beam; and $\tau$ represents optical delay between the first fundamental beam and the second fundamental beam.

29. A system as in claim 27, wherein the first image detector registers the linear interferometric pattern at a fundamental frequency according to:

$$S_{INT}^{(v)}(f,x) \to S_{INT}^{(v)}(f,\tau) \propto |\int \{E(t+\tau)+E(t)\}\exp(2\pi ift)dt|^2$$

wherein E(t) represents a time domain analytic signal of the light beam; and $\tau$ represents optical delay between the first fundamental beam and the second fundamental beam.

30. A system as in claim 19, wherein the movable mask is in the first position, the first image detector registers no signal at a fundamental frequency of the first and second beams and the second image detector registers a standard SHG-FROG pattern.

31. A system as in claim 30, wherein the second image detector registers the standard SHG-FROG pattern according to:

$$S_{FROG}^{(2\nu)}(f,x) \to S_{FROG}^{(2\nu)}(f,\tau) \propto |\int \{2E(t+\tau)E(t)\}\exp(2\pi ift)dt|^2$$

wherein E(t) represents a time domain analytic signal of the light beam; and $\tau$ represents optical delay between the first fundamental beam and the second fundamental beam.

32. A system as in claim 15, wherein a position of the beam splitter determines the optical delay of the first fundamental beam and the second fundamental beam.

33. A system as in claim 32, wherein the optical delay of the first and second beams equals approximately zero.

34. A system that characterizes a light beam, comprises:
a plurality of mirrors receiving a first fundamental beam and a second fundamental beam and reflecting the first fundamental beam and the second fundamental beam;
a nonlinear crystal, a thickness of the crystal allowing phase matching, the reflected first fundamental beam and the second fundamental beam intersecting the crystal at an angle $\alpha$, the crystal inducing optical delay between the first fundamental beam and the second fundamental beam, the crystal partially transmitting the first fundamental beam and the second fundamental beam, the crystal partially converting the first fundamental beam into a first second harmonic beam and partially converting the second fundamental beam into a second second harmonic beam having a double optical carrier frequency $2\nu_0$, the crystal generating a sum frequency beam;
a lens, the lens receiving from the crystal the first fundamental beam, second fundamental beam, the first second harmonic beam, the second second harmonic beam and the sum frequency beam and refracting the first fundamental beam, second fundamental beam, the first second harmonic beam, the second second harmonic beam and the sum frequency beam;
a movable mask, the mask having three positions, a first position blocking the first fundamental beam, the first second harmonic beam, the second fundamental beam and the second second harmonic beam, a second position blocking at least one of a first fundamental beam/first harmonic beam pair and a second fundamental beam/second harmonic beam pair, and a third position blocking none of the first fundamental beam, second fundamental beam, the first second harmonic beam, the second second harmonic beam and the sum frequency beam.

35. A method for characterizing a light beam, comprising the steps of:
(a) constructing a spectral phase of a light pulse;
(b) combining the spectral phase of the light pulse with a plurality of amplitude values from an experimentally measured spectrum at fundamental frequency;
(c) calculating an SHG-FROG signal amplitude using the combined amplitude;
(d) replacing a modulus of the calculated SHG-FROG signal with an experimentally measured SHG-FROG signal;
(e) determining a new spectral amplitude using the replaced SHG-FROG signal;
(f) establishing a new spectral phase with the determined new spectral amplitude; and
(g) calculating an error rating, the error rating measuring the difference between the calculated SHG-FROG pattern and the experimentally measured SHG-FROG signal; and
repeating steps (b)–(g) until the error rating is minimized; and
comparing retrieved pulse and an experimentally acquired SPRINT-ASSA pattern.

36. A method as in claim 35, wherein the repeating step continues until acquiring a predetermined error rating.

37. A method as in claim 35, wherein the comparing step eliminates time direction ambiguity.

* * * * *